(12) United States Patent
Russell et al.

(10) Patent No.: US 9,195,765 B2
(45) Date of Patent: Nov. 24, 2015

(54) METHOD AND APPARATUS FOR PRESENTING CONTENT

(75) Inventors: Anthony George Russell, Leichhardt (AU); Vlado Jureta, Jersey City, NJ (US)

(73) Assignee: Oso IP, LLC, Longview, TX (US)

(*) Notice: Subject to any disclaimer, the term of this patent is extended or adjusted under 35 U.S.C. 154(b) by 822 days.

(21) Appl. No.: 12/673,338

(22) PCT Filed: Jul. 22, 2008

(86) PCT No.: PCT/AU2008/001059
§ 371 (c)(1),
(2), (4) Date: Jun. 10, 2011

(87) PCT Pub. No.: WO2009/021265
PCT Pub. Date: Feb. 19, 2009

(65) Prior Publication Data
US 2011/0231767 A1    Sep. 22, 2011

(30) Foreign Application Priority Data
Aug. 16, 2007 (AU) .............................. 2007904409

(51) Int. Cl.
| | | |
|---|---|---|
| G06F 3/00 | (2006.01) | |
| G06F 17/30 | (2006.01) | |
| G06Q 30/02 | (2012.01) | |
| G06Q 30/06 | (2012.01) | |

(52) U.S. Cl.
CPC .......... G06F 17/3087 (2013.01); G06Q 30/02 (2013.01); G06Q 30/06 (2013.01)

(58) Field of Classification Search
None
See application file for complete search history.

(56) References Cited

U.S. PATENT DOCUMENTS

| | | |
|---|---|---|
| 5,948,061 A | 9/1999 | Merriman et al. |
| 6,522,250 B1 | 2/2003 | Ernst et al. |
| 6,567,397 B1 | 5/2003 | Campana, Jr. et al. |
| 6,625,456 B1 | 9/2003 | Busso et al. |
| 6,834,195 B2 | 12/2004 | Brandenberg et al. |
| 6,910,078 B1 | 6/2005 | Raman et al. |
| 7,073,129 B1 | 7/2006 | Robarts et al. |
| 7,254,411 B2 | 8/2007 | Cheng et al. |

(Continued)

FOREIGN PATENT DOCUMENTS

| | | |
|---|---|---|
| DE | 10132714 A1 | 5/2003 |
| JP | 2005332084 | 12/2005 |

OTHER PUBLICATIONS

International Search Report issued in PCT/AU08/01059 on Sep. 23, 2008.

(Continued)

*Primary Examiner* — Matt Kim
*Assistant Examiner* — Hua Lu

(57) ABSTRACT

A method and apparatus is disclosed for providing content to a user. The method includes using sensor data from multiple sensors associated with the user to determine a trigger event, determining content associated with the trigger event, and causing the content to be presented to the user. A trigger rule is created which defines the trigger event, representing when content is to be presented. A number of different types of event criteria may be defined, such as position event criteria, movement event criteria, timing or duration criteria, time and/or date criteria, heart rate criteria, or the like, allowing each of the event criteria to be associated with a respective type of sensor. Also disclosed is a method and apparatus for charging for providing content to a user.

95 Claims, 14 Drawing Sheets

(56) References Cited

U.S. PATENT DOCUMENTS

| | | |
|---|---|---|
| 7,313,766 B2 | 12/2007 | Kautto Kiovula et al. |
| 7,636,574 B2 | 12/2009 | Poosala |
| 7,970,111 B2 | 6/2011 | Swanburg |
| 8,412,169 B2 | 4/2013 | McGary et al. |
| 8,559,968 B2 | 10/2013 | Frank et al. |
| 8,572,088 B2 | 10/2013 | Lu et al. |
| 8,584,940 B2 | 11/2013 | Mesaros |
| 8,653,963 B2 | 2/2014 | Vallaire |
| 8,676,932 B2 | 3/2014 | Bhatti |
| 8,682,350 B2 | 3/2014 | Altman et al. |
| RE44,899 E | 5/2014 | Merriman et al. |
| 8,779,917 B1 | 7/2014 | White |
| 2002/0026445 A1* | 2/2002 | Chica et al. ............ 707/100 |
| 2002/0113735 A1 | 8/2002 | Spratt |
| 2003/0009281 A1 | 1/2003 | Whitham |
| 2003/0018521 A1 | 1/2003 | Kraft et al. |
| 2003/0027558 A1 | 2/2003 | Eisinger |
| 2003/0034888 A1 | 2/2003 | Ernst et al. |
| 2003/0036962 A1 | 2/2003 | Holt |
| 2004/0078813 A1 | 4/2004 | Kobuya et al. |
| 2004/0117819 A1 | 6/2004 | Yu |
| 2004/0203909 A1* | 10/2004 | Koster ............... 455/456.1 |
| 2005/0003804 A1* | 1/2005 | Huomo et al. ......... 455/414.1 |
| 2005/0289588 A1 | 12/2005 | Kinnear |
| 2006/0242267 A1 | 10/2006 | Grossman |
| 2006/0265283 A1* | 11/2006 | Gorodyansky ............ 705/14 |
| 2006/0277567 A1 | 12/2006 | Kinnear |
| 2006/0287813 A1* | 12/2006 | Quigley ................ 701/201 |
| 2006/0294192 A1* | 12/2006 | Mao et al. ............. 709/213 |
| 2007/0006098 A1* | 1/2007 | Krumm et al. .......... 715/825 |
| 2007/0123275 A1 | 5/2007 | Faraz |
| 2007/0139182 A1 | 6/2007 | O'Connor et al. |
| 2007/0192409 A1 | 8/2007 | Kleinstern et al. |
| 2007/0270132 A1 | 11/2007 | Poosala |
| 2007/0274685 A1* | 11/2007 | Hale et al. ............... 386/97 |
| 2008/0065481 A1* | 3/2008 | Immorlica et al. ........ 705/14 |
| 2008/0109317 A1 | 5/2008 | Singh |
| 2008/0215437 A1* | 9/2008 | Levy et al. ............... 705/14 |
| 2008/0222071 A1 | 9/2008 | Bhatti |
| 2008/0281711 A1 | 11/2008 | Bridges et al. |
| 2008/0288350 A1* | 11/2008 | Iris et al. ................. 705/14 |
| 2009/0003355 A1* | 1/2009 | Jain et al. ............... 370/400 |
| 2009/0061884 A1 | 3/2009 | Rajan et al. |
| 2010/0306402 A1 | 12/2010 | Russell et al. |
| 2011/0276396 A1 | 11/2011 | Rathod |
| 2012/0220314 A1 | 8/2012 | Altman et al. |
| 2014/0139335 A1 | 5/2014 | Vallaire |

OTHER PUBLICATIONS

Written Opinion issued in PCT/AU08/01059 on Feb. 25, 2010.
Re-Examination Application No. 90/011,589, filed Jun. 29, 2011.

* cited by examiner

METHOD AND APPARATUS FOR PRESENTING CONTENT

CLAIM OF PRIORITY

This application claims the benefit of Australian Patent Application No. 2007/904409, filed Aug. 16, 2007, the entire contents of which are incorporated herein by reference.

BACKGROUND OF THE INVENTION

The present invention relates to a method and apparatus for presenting content, and in particular to presenting content. The present invention also relates to a method and apparatus for charging for content presentation, and in particular to charging using a variable or dynamic charging model.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to provide content to users for presentation in certain specific locations. Examples of this are provided in a number of documents.

US 2004078813 describes a system for providing tour guide contents utilized by a user at a travel destination consisting of guide information including POI information, map data and the like, and user information including memoranda written by the user. The user can access a contents server from a user terminal, and is able to customize at the contents server the tour guide contents to be utilized at a travel destination. Customized tour guide contents are stored into a memory medium at a business terminal, and the memory medium is installed in an electronic guide apparatus, such as at an airport counter. The user receives the electronic guide apparatus and a GPS on a rental basis at the airport counter, and takes them to the travel destination. Then, the user is able to utilize the tour guide contents customized for the user at the travel destination.

DE 10132714 describes a method for provision of an electronic tour guide in which a number of small electronic devices are combined in a single unit with appropriate software so that user information requests can be answered. The invention also relates to a corresponding device with a single controlling processor that takes control of individual processors in constituent devices. The device comprises a GPS receiver for navigation purposes and a pocket computer or mobile phone with means for accessing tourist information, travel and booking centers, etc.

US 2003009281 describes an interactive multimedia tour guide provides a user with packaged tours in a multimedia format that includes directions and useful information about a selected tour. The packaged tours are composed of principle and ancillary points of interest. The user may preview and select a packaged tour or generate a custom tour by selecting points of interest from two or more packaged tours. On initial installation, a user profile is developed which is used to generate a preference mask. A preference mask also may be generated for one or more travel companions. The user's preference mask or a composite preference mask generated by a combining function of the user's preference mask and one or more travel companions' preference masks is used to customize a selected tour by selecting only those ancillary points of interest that would be of most interest to the user and his or her travel companion(s). The selected tour is stored on a portable self-contained electronic system which includes a GPS navigation system and cell phone. The system includes voice recognition software and speech synthesis software to provide the user with a verbal interface that provides directions and information on various points of interest during the tour. The interactive multimedia tour guide allows the user to modify the tour while in progress and, in addition, serves the function of a concierge to identify dining and lodging options and to make reservations for the user. The flexibility of the interactive multimedia tour guide allows the user to begin a tour at any point and to change the tour as the spirit dictates, allowing the user an unprecedented degree of freedom in their sightseeing. Combined with an optional still or video camera, the interactive multimedia tour guide allows for rapid identification and editing of pictures or videos made on a tour.

U.S. Pat. No. 7,073,129 describes an automated selection of appropriate information based on computer users context. A system filters received messages (e.g., unsolicited advertisements) to determine if they are appropriate for a user based on the non-static, constantly evolving, context of the user. The system can track the user's context by monitoring various environmental parameters, such as related to the user's physical, mental, computing and data environments, and can model the current context of the user based at least in part on the monitoring. The system selects a set of one or more filters to apply to incoming messages based on the user's context, and the selected filters can be updated as the user's context changes. Messages that survive the filters are then evaluated against the user's context to determine whether they should be presented immediately or stored for delayed presentation.

It is also known to charge for the provision of content. Historically, charging models for both traditional and digital content have been relatively static and inflexible. For example, charging for newspapers has generally been made with a list or fixed price. Radio and television emerged as content channels relying on advertising or third party subsidies. Subscription services and pay-per-view are now available but again, the charging model is considered static since the content provider advertises a price based on a predetermined mix of pricing attributes based on market characteristics. More recently, the Internet has given rise to content service providers who offer content to the consumer free of charge, with embedded advertising.

SUMMARY OF THE PRESENT INVENTION

In a first broad form the present invention provides a method of providing content to a user, the method including, in a processing system:
 a) using sensor data from multiple sensors associated with the user to determine a trigger event;
 b) determining content associated with the trigger event; and,
 c) causing the content to be presented to the user.

It should be noted that reference the processing system should be read as a reference to one or more processing systems, as different steps of the method may be performed on physically different processing systems, which are considered to be the processing system.

Typically the method includes, in the processing system:
 a) comparing the sensor data to at least one trigger rule; and, b) selectively determining a trigger event based on the result of the comparison.

Typically each trigger rule is associated with a respective content instance and wherein the method includes, in the processing system, presenting the content instance if the respective trigger rule is satisfied.

Typically each trigger rule is defined by metadata associated with the content instance, and wherein the method includes, in the processing system, comparing the sensor data to the metadata to determine if the trigger rule is satisfied.

Typically each trigger rule includes event criteria defining conditions representing the trigger event.

Typically the event criteria define a sequence of events, and wherein the method includes, in the processing system:
 a) comparing sensor data from each sensor to event criteria representing a respective condition; and,
 b) determining a trigger event if each event is satisfied.

Typically each type of sensor is associated with a respective type of event criteria and wherein the method includes, in the processing system, comparing sensor data from a sensor to a respective one of the event criteria based on the event criteria type.

Typically the method includes, in the processing system:
 a) determining, from a position sensor, position information indicative of a position of the user; and,
 b) comparing the position information to position event criteria to determine if at least one condition relating to a user's position is satisfied.

Typically the method includes, in the processing system, monitoring at least one of:
 a) a position sensor to determine position information indicative of a position of the user;
 b) a temperature sensor to determine temperature information indicative of an environment temperature;
 c) a timer to provide timing information indicative of a time;
 d) a clock to provide at least one of time and date information indicative of a time;
 e) a heart rate sensor to determine, heart rate information indicative of a heart rate of the user; and,
 f) a movement sensor to determine movement information indicative of movement of the user.

Typically the method includes, in the processing system:
 a) determining a content thread including at least one trigger rule and at least one content instance;
 b) storing the content thread in a store;
 c) comparing sensor data to the trigger rule to determine a trigger event; and,
 d) selectively causing the at least one content instance to be retrieved from the store for presentation to the user in response to determination of a trigger event.

Typically the method includes, in the processing system:
 a) determining a selected content package, the content package including a plurality of content threads;
 b) storing the content package in a store;
 c) comparing sensor data to each trigger rule to determine a trigger event; and,
 d) causing a respective content instance to be retrieved from the store for presentation to the user if a respective trigger event is satisfied.

Typically the method includes, in the processing system:
 a) determining at least one trigger rule associated with a content thread, the content thread including at least one trigger rule and at least one content instance;
 b) storing the at least one trigger rule in a store;
 c) comparing sensor data to the at least one trigger rule to determine a trigger event; and,
 d) selectively causing the at least one content instance to be retrieved from a computer system via a communications network for presentation to the user, in response to determination of a trigger event.

Typically the method includes, in the processing system:
 a) determining a selected content package, the content package including a plurality of content threads;
 b) storing the trigger rules in a store;
 c) comparing sensor data to each trigger rule to determine a trigger event; and,
 d) causing a respective content instance to be retrieved from the complete system via a communications network for presentation to the user if a respective trigger event is satisfied.

Typically the method includes, in the processing system:
 a) transferring sensor data to a computer system via a communications network, the computer system operating to determine if at least one trigger rule is satisfied;
 b) if the at least one trigger rule is satisfied, receiving content from the computer system; and,
 c) causing the content to be presented to the user.

Typically the method includes, in the processing system:
 a) monitoring the sensors; and,
 b) determining sensor data in response to a change in output of any one of the sensor outputs.

Typically a content instance includes at least one of:
 a) audio content;
 b) video content;

Typically the method includes, in the processing system, communicating with a computer system to at least one of:
 a) select content for presentation;
 b) downloaded trigger rules associated with content for presentation;
 c) downloaded content for presentation; and,
 d) receive a content stream for presentation.

In a second broad form the present invention provides apparatus for providing content to a user, the apparatus including a processing system for:
 a) using sensor data from multiple sensors associated with the user to determine a trigger event;
 b) determining content associated with the trigger event; and,
 c) causing the content to be presented to the user.

Typically the apparatus includes:
 a) a position sensor for determining position information indicative of a position of the user;
 b) a temperature sensor for determining temperature information indicative of an environment temperature;
 c) a timer to provide timing information indicative of a time;
 d) a clock to provide at least one of time and date information indicative of a time;
 e) a heart rate sensor for determining heart rate information indicative of a heart rate of the user; and,
 f) a movement sensor for determining movement information indicative of movement of the user.

Typically the processing system forms part of at least one of:
 a) a presentation device for presenting content; and,
 b) an end station for at least one of:
  i) providing content to a presentation device for presentation; and,
  ii) communicating with a computer system to obtain content for presentation.

Typically the processing system includes:
a) a store for storing at least one of:
   i) content to be presented; and,
   ii) at least one trigger rule indicative of a trigger event; and,
b) a processor for:
   i) comparing sensor data received from sensors to the at least one trigger rule to determine a trigger event; and,
   ii) selectively causing content to be presented to the user in response to a trigger event.

Typically the processing system forms part of a presentation device, and wherein the presentation device further includes a presentation means including at least one of:
a) a display for displaying content; and,
b) an audio system for presenting audio content.

In a third broad form the present invention provides a method of providing content to a user, the method including, in a computer system:
a) receiving, from a processing system, a request for content; and,
b) providing content to the processing system in response to the request to thereby allow the processing system to:
   i) use sensor data from multiple sensors associated with the user to determine a trigger event;
   ii) determine content associated with the trigger event; and,
   iii) cause the content to be presented to the user.

Typically the method includes, in the computer system, providing a content thread to the processing system, the content thread including at least one trigger rule and at least one content instance, the processing system being for:
a) storing the content thread in a store;
b) comparing sensor data to the at least one trigger rule to determine a trigger event; and,
c) selectively causing the at least one content instance to be retrieved from the store for presentation to the user in response to determination of a trigger event.

Typically the method includes, in the computer system:
a) providing at least one trigger rule associated with a content thread to the processing system, the content thread including at least one trigger rule and at least one content instance, the processing system being for:
   i) storing the at least one trigger rule in a store;
   ii) comparing sensor data to the at least one trigger rule to determine a trigger event; and,
   iii) selectively requesting at least one content instance from the computer system in response to determination of a trigger event; and,
b) providing the requested content instance to the processing system to allowing the content instance to be presented to the user.

Typically the method includes, in the computer system:
a) receiving sensor data from the processing system;
b) comparing sensor data to at least one trigger rule to determine a trigger event; and,
c) in response to determination of a trigger event:
   i) determining content associated with the trigger event; and,
   ii) providing the content to the processing system to cause the content to be presented to the user.

In a fourth broad form the present invention provides apparatus for providing content to a user, the apparatus including a computer system for:
a) receiving, from a processing system, a request for content; and,
b) providing content to the processing system in response to the request to thereby allow the processing system to:
   i) use sensor data from multiple sensors associated with the user to determine a trigger event;
   ii) determine content associated with the trigger event; and,
   iii) cause the content to be presented to the user.

In a fifth broad form the present invention provides a method of providing content to a user, the method including, in a system:
a) causing a trigger rule to be defined representing a trigger event, the trigger rule representing conditions that must be met by data from each of multiple sensors for a trigger event to occur; and,
b) causing an association between content and the trigger rule to be created, such that the content can be presented when a trigger event occurs.

Typically the method includes, in the system:
a) defining metadata representing the trigger rule; and,
b) associating the metadata with respective content to form a content thread.

Typically the method includes, in the system creating event criteria for each trigger rule, the event criteria defining conditions representing the trigger event.

Typically the event criteria define a sequence of events.

Typically each type of sensor is associated with a respective type of event criteria.

Typically the method includes, in the system, defining at least one of:
a) position event criteria defining conditions associated with a position of the user;
b) temperature event criteria defining conditions associated with an environment temperature;
c) time event criteria defining conditions associated with a time;
d) date event criteria defining conditions associated with a date;
e) duration event criteria defining conditions associated with a duration;
f) heart rate event criteria defining conditions associated with a heart rate of the user; and,
g) movement event criteria defining conditions associated with movement of the user.

Typically the method includes, in the system:
a) determining a gross value associated with the content; and,
b) causing the content and the associated trigger rule to be provided in response to payment, at least partially in accordance with the gross value.

Typically the method includes, in the system:
a) determining at least one of a visibility setting and a publish date associated with the content; and,
b) causing the content to be made available in accordance with at least one of the visibility setting and the publish date.

Typically the method includes, in the system:
a) determining at least one tag associated with the content, the tag representing a content categorisation; and,
b) allowing the content of interest to be located at least in part using the tag.

Typically the system includes a computer system and a processing system that communicate to allow at least one of:
a) trigger rules to be defined;
b) content threads to be created;
c) packages of content threads to be created; and,
d) content to be obtained for presentation.

Typically the method includes, in a processing system:
a) determining an indication of a trigger rule and associated content at least partially in accordance with user input commands; and,
b) transferring the indication to the computer system.

Typically the method includes, in the computer system:
a) receiving an indication of at least one trigger rule and at least one associated content to instance from the processing system; and,
b) creating a thread representing an association between the at least one content instance and the at least one trigger rule.

Typically the processing system is part of a presentation device or an end station.

Typically the computer system is part of a base station.

In a sixth broad form the present invention provides apparatus for providing content to a user, the apparatus including a system for:
a) defining a trigger rule representing a trigger event, the trigger rule representing conditions that must be met by data from each of multiple sensors for a trigger event to occur; and,
b) associating content with the trigger rule, such that the content can be presented when a trigger event occurs.

Typically the apparatus includes at least one of a processing system and a computer system.

Typically the apparatus includes:
a) a processing system for providing an indication of a trigger rule and associated content; and,
b) a computer system for:
  i) receiving an indication of the trigger rule and associated content from the processing system; and,
  ii) creating a thread including the content and an indication of the trigger rule.

In a seventh broad form the present invention provides a method of charging for providing content to a user, the method including, in a system:
a) for content to be provided, determining a content value;
b) determining a user charge;
c) determining a charge balance;
d) determining second content in accordance with the charge balance; and,
e) causing the content and the second content to be provided for presentation.

Typically the method includes, in the system, determining the second content in accordance with at least one of:
a) a user profile; and,
b) user input commands.

Typically the method includes, in the system, determining the user charge in accordance with at least one of:
a) a user profile; and,
b) user input commands.

Typically the system includes a computer system and a processing system that communicate to allow at least one of:
a) a user charge to be determined;
b) second content to be determined; and,
c) the content and the second content to be provided for presentation.

Typically the method includes, in a computer system:
a) determining the content value; and,
b) transferring an indication of the content value to a processing system for presentation to a user.

Typically the method includes, in a processing system:
a) presenting an indication of the content value to the user;
b) determining an indication of a user charge at least partially in accordance with user input commands; and,
c) transferring the indication to a computer system, the computer system being responsive to the indication to determine the charge balance.

Typically the method includes, in a computer system:
a) receiving an indication of a user charge from a processing system; and,
b) using the indication to determine the charge balance.

Typically the method includes, in a computer system:
a) using the charge balance to determine at least one second content option; and,
b) transferring an indication of the at least one second content option to a processing system for presentation to a user.

Typically the method includes, in a processing system:
a) presenting an indication of at least one second content option to the user;
b) determining an indication of user selected second content at least partially in accordance with user input commands; and,
c) transferring the indication to a computer system, the computer system being responsive to the indication to provide the content and the second content for presentation.

Typically the method includes, in the computer system:
a) receiving an indication of user selected second content from a processing system;
b) using the indication to determine the second content; and,
c) transferring the content and the second content to the processing system for presentation to a user.

Typically the method includes, in the system:
a) causing an indication of the content value to be displayed to the user;
b) determining the user charge in accordance with an indication provided by the user;
c) selecting the second content in accordance with the charge balance and a user profile; and,
d) causing the second content to be displayed to the user.

Typically the second content includes at least one of
a) third party content;
b) advertising; and,
c) market surveys.

In an eighth broad form the present invention provides apparatus for charging for providing content to a user, the apparatus including a system for:
a) for content to be provided, determining a content value;
b) determining a user charge;
c) determining a charge balance;
d) determining second content in accordance with the charge balance; and,
e) causing the content and the second content to be provided for presentation.

Typically the system includes:
a) a processing system for providing an indication of a user charge; and,
b) a computer system for:
  i) determining the content value;
  ii) determining the charge balance using the indication of the user charge;
  iii) determining second content; and,
  iv) providing the content and the second content for presentation.

Typically the a computer system determines the second content at least partially using an indication of user selected second content provided by the processing system.

It will be appreciated that the broad forms of the invention may be used in conjunction or independently.

BRIEF DESCRIPTION OF THE DRAWINGS

An example of the present invention will now be described with reference to the accompanying drawings, in which.

DETAILED DESCRIPTION OF PREFERRED EMBODIMENTS

Figures 1A, 1B:
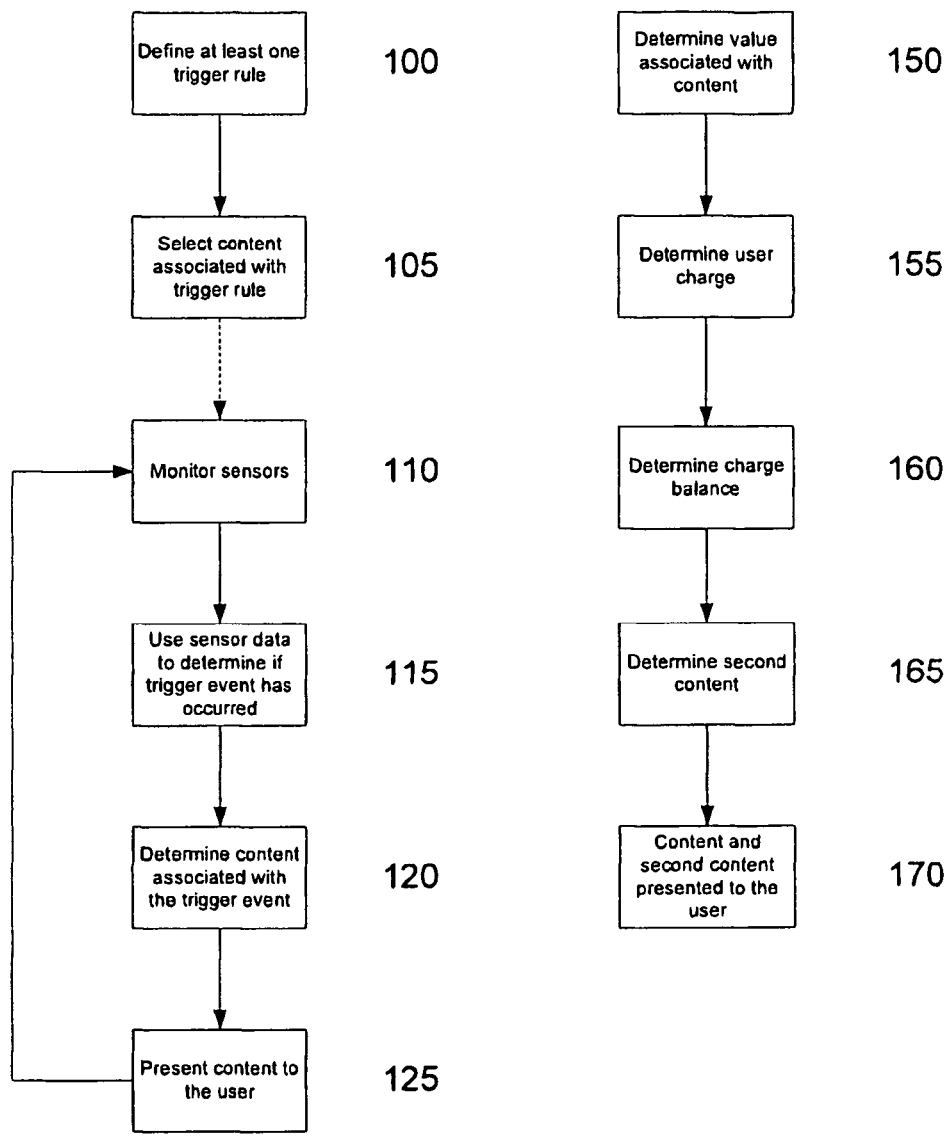
FIG. 1 is a flow chart of an example of a process for displaying content.

An example of a process for presenting content for use will now be described with reference to FIG. 1A.

At step 100 a trigger rule is created which defines a trigger event representing when content is to be presented. In one example, the trigger rule can include event criteria representing conditions that must be satisfied in order for the trigger event to occur. Satisfaction of the conditions is generally determined by monitoring sensors associated with a user. A number of different types of event criteria may be defined, such as position event criteria, movement event criteria, timing or duration criteria, time and/or date criteria, heart rate criteria, or the like, allowing each of the event criteria to be associated with a respective type of sensor.

At step 105, the trigger rule is associated with content having one or more content instances which can be displayed when the trigger event occurs. The combination of content and associated trigger rule is generally referred to as a thread. In one example, a thread is formed from the content to be presented together with embedded or referenced metadata that allows the presentation of the content to be controlled, as will be described in more detail below.

Following creation of threads, which may be performed multiple times and by different individuals, threads can be provided for presentation using a content presentation process, as will now be described.

In one example, this is achieved by monitoring a number of sensors to determine sensor data at step 110. The sensors are typically sensors associated with the user in some manner to allow conditions relating to the user or an environment to be determined. The conditions can include information such as a user's position, motion, heart rate, as well as a local environment temperature, duration of an event, time or date, or the like. It will be appreciated from this that a wide range of sensors may be used depending on the preferred implementation and this will be described in more detail below.

At step 115 sensor data obtained from the sensors is used to determine if a trigger event has occurred. This is typically achieved by comparing the sensor data to event criteria defined by a trigger rule, to thereby determine if conditions representing a trigger event are satisfied. The event criteria are typically defined for selected multiple sensors and the occurrence of a trigger event will only occur if the event criteria are satisfied for each of the selected sensors simultaneously and/or in a predefined sequence.

Once it is determined that a trigger event has occurred, content associated with the trigger event is determined at step 120 with the content being presented to the user at step 125.

It will be appreciated that this may be achieved in any one of a number of ways. Thus for example, content threads can be created using a suitable processing system, and then downloaded or streamed to a presentation device carried or worn by the user. This allows the presentation device to detect when the event criteria are satisfied and hence when a trigger event occurs, at which point the presentation device arranges for the content to be presented to the user. This may be achieved using any appropriate presentation means, such as a display and/or audio system or the like, and this will typically depend on the preferred implementation and the nature of the content, which may include video, audio or other multi-media content.

In one example, content threads may be created and presented locally using a single presentation device and/or associated processing system. However, alternatively and/or additionally the process may be implemented at least partially, or completely using a distributed architecture. In one example, this allows content to be created centrally and downloaded or streamed to presentation devices for presentation. Alternatively, trigger events can be monitored by a central base station, with content being presented to the user via a personal computer or other presentation device, as required.

An example of a process for charging for content will now be described with reference to FIG. 1B.

In this example, at step 150 a value associated with content is determined. This may be achieved, for example by having users create content and designate a monetary or other value associated with the content. Alternatively this information can be determined using any other one of a number of suitable mechanisms.

At step 155 a user charge is determined. The user charge typically represents a monetary or other value that an individual is willing to pay to view the content. This may be determined using any suitable mechanism but typically requires some form of input from the user to allow the user charge to be specified.

At step 160 a charge balance is determined representing any difference between the content value and the user charge.

At step 165, assuming a charge balance exists, second content is selected. The second content represents content that is to be presented to the user to make up for any difference between the determined content value and the user charge. Thus, for example, if the content value is $1 and the user charge is only 50 cents, then it is necessary to obtain an additional 50 cents of revenue from some source. This can be achieved by presenting second content to the user in the form of advertising, market surveys, or the like. This second content is used to provide an alternative income source that can be added to the user charge to recoup the charge balance.

At step 170 the content and the second content can be provided to the user for presentation.

Figure 2:
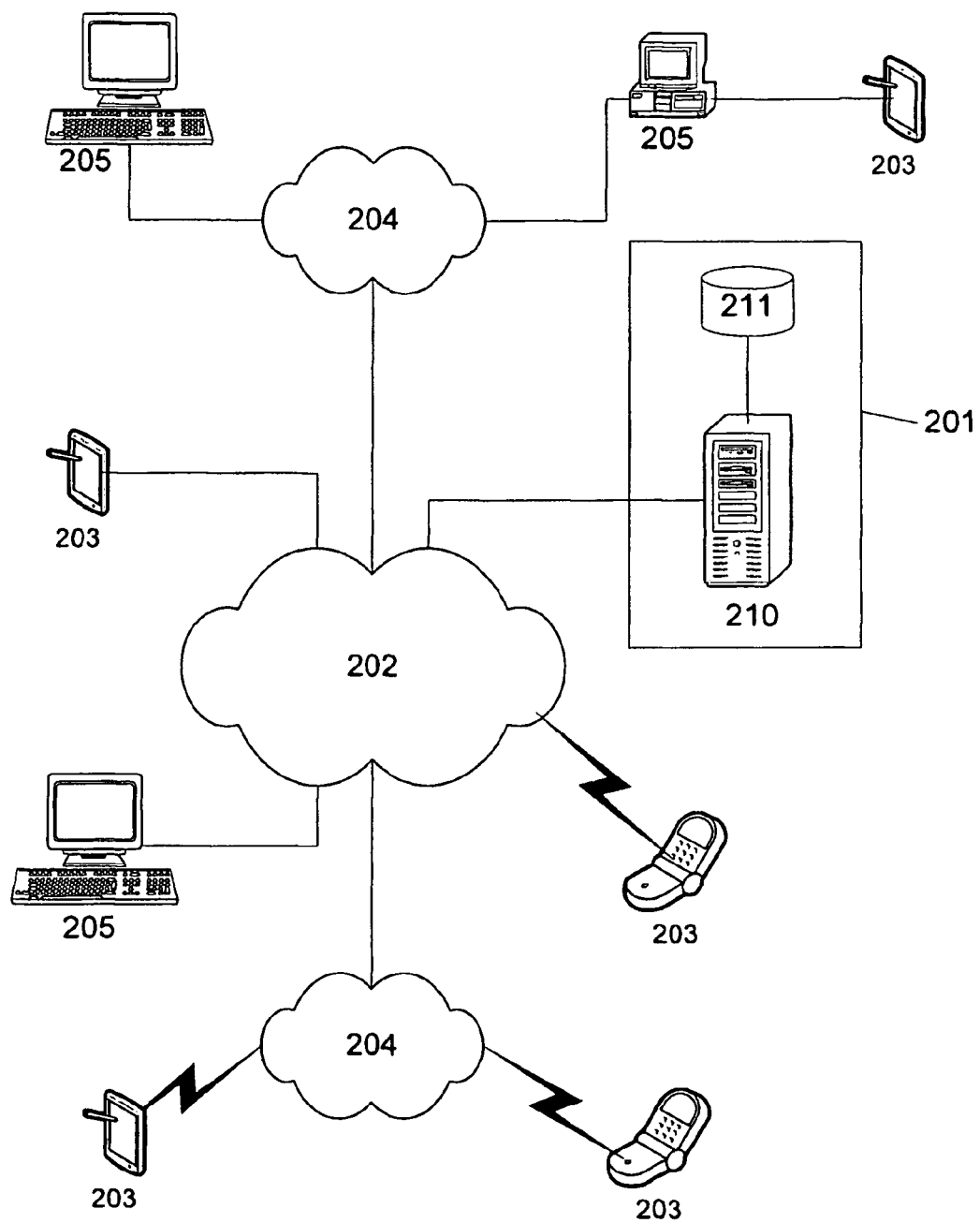
FIG. 2 is a schematic diagram of an example of a system for displaying content.

The above processes can be performed using a distributed architecture, an example of which will now be described with reference to FIG. 2.

In this example, a base station 201 is coupled to a number of presentation devices 203 and/or end stations 205, via a communications network 202, such as the Internet, and/or via one or more communications networks 204, such as local area networks (LANs), or wide area networks (WANs), 3G, GSM (Global System for Mobile Communications), PSTN (public switched telephone network) networks, cable or fibre networks, or the like.

The base station 201 typically includes one or more processing systems 210, optionally coupled to one or more databases 211. In use, the processing system 210 is adapted to store content in the database 210, allowing the content to be retrieved and viewed by users using the end stations 205 and/or the presentation devices 203. Additionally, the processing system 210 can be adapted to allow users to submit content (commonly referred to as user generated content) to the base station 201, using the end stations 205 and/or the presentation devices 203, allowing the submitted content to be viewed by third parties.

Figure 3:
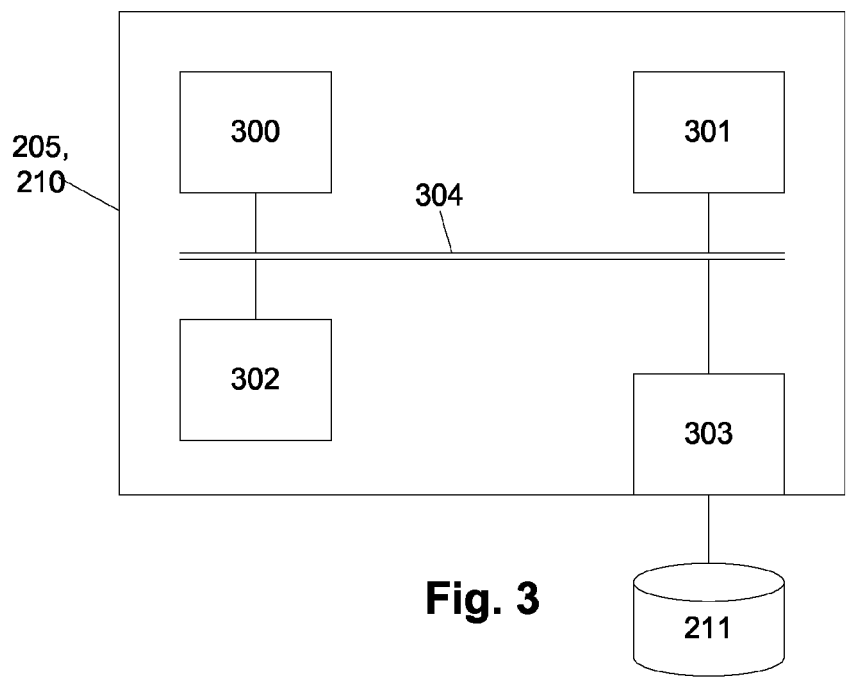
FIG. 3 is a schematic diagram of an example of a processing system.

Accordingly, any form of suitable processing system 210 may be used. An example is shown in FIG. 3. In this example, the processing system 210 includes at least a processor 300, a memory 301, such as RAM, a hard drive or other removable media, an input/output (I/O) device 302, such as a keyboard, and display, and an external interface 303, coupled together via a bus 304 as shown. The external interface can be used to connect the processing system 210 to an external database 210, which can be used for storing content, as will be appreciated by persons skilled in the art.

In use, the processor 300 executes applications software stored in the memory 301, to enable data transfer via the communications networks 202, 204 and in some cases provide web-hosting and file transfer protocol (FTP) functionality. Accordingly, it will be appreciated that the processing system 210 may be formed from any suitable processing system, such as a suitably programmed PC, Internet terminal, lap-top, hand-held PC, network server, web server, or the like. In one example, the processing system 210 is a network server connected via a high-bandwidth connection to the Internet.

Similarly the end stations 205 may be formed from a processing system having a similar configuration. In this instance, the end station typically executes applications software to enable data transfer via the communications networks 202, 204 and in some cases provide web-browsing, file transfer protocol (FTP), and optionally content presentation functionality. This allows the end stations 205 to communicate with the processing system 210 to allow content to be provided thereto, or obtained therefrom. Additionally, the end stations 205 may be adapted to communicate with presentation devices 203, to allow content to be provided thereto.

It will be appreciated that this allows a number of different forms of end station 205 to be used, such as a suitably programmed PC, Internet terminal, lap-top, hand-held PC, smart phone, PDA, or the like, which is typically operating applications software to enable data transfer and in some cases web-browsing.

The presentation devices 203 are typically adapted to receive content, from either the end stations 205 or the base station 201, and allow the content to be presented to the user in some manner. The presentation device 203 is also typically adapted to monitor a number of sensors to allow the presentation of content to be controlled in accordance with the occurrence of trigger events.

Figure 4:
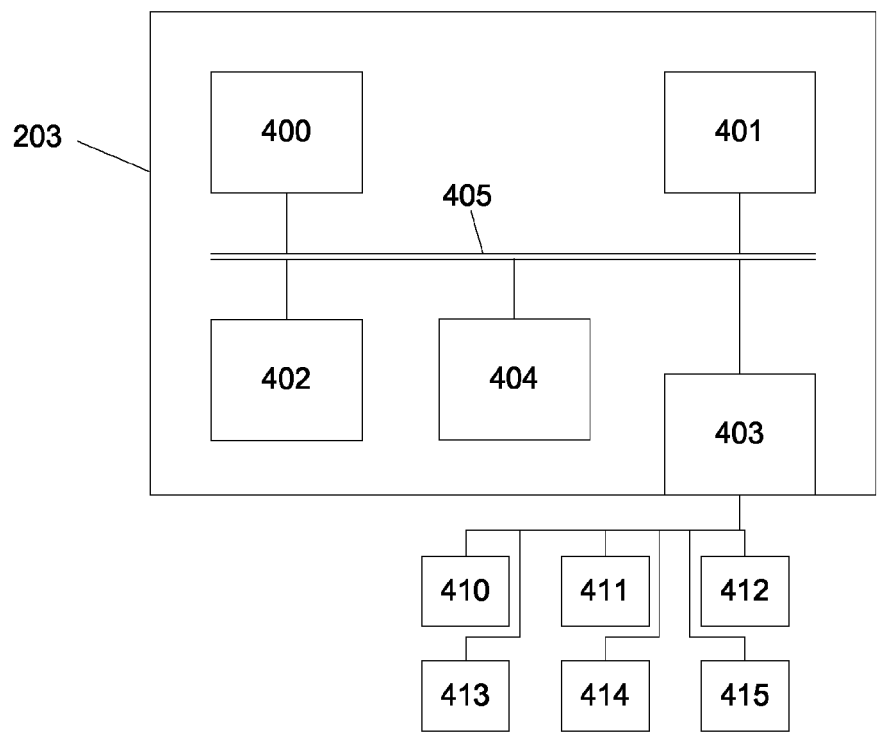
FIG. 4 is a schematic diagram of an example of a presentation device.

An example of a presentation device 203 is shown in FIG. 4. In this example, the processing presentation device 203 includes a processor 400, a memory 401, such as RAM, a hard drive or other removable media, an input/output (I/O) device 402, such as a keyboard, and display, an external interface 403 and an optional communications module 404, coupled together via a bus 405 as shown.

In use, the external interface 403 can be used to couple the presentation device to a number of sensors shown generally at 410, . . . 415. A list of example sensors is shown in Table 1, although it will be appreciated that in practice any generic sensor that is capable of being monitored can in theory be utilised.

TABLE 1

| Sensor | Functionality |
| --- | --- |
| GPS | Location, Time, Speed, Altitude, Bearing |
| Heart rate monitor | Fitness |
| Pedometer/Accelerometer | Movement |
| Digital compass | Direction, Bearing |
| Cadence monitor | Cycling |
| Gyroscope | Position |
| Bluetooth | Location, other users |
| Wifi, WiMax | Location, other users |
| RFID | Location, other information |
| Temperature | Temperature |
| Motion sensor | Up/Down, Left/Right movement |

The external interface 403 may also be used to couple the presentation device to the communications networks 202, 204, or one of the end stations 205, to allow data to be transferred thereto, or received therefrom. This can be achieved using either wired connections, such as a USB (Universal Serial Bus), Firewire, Ethernet connection, or the like, or may be achieved using a wireless connection, such as Bluetooth, WiFi, or the like. Similarly, the communications module 404 may be used to allow certain communications to be performed, such as allowing mobile phone calls, data transfer via a wireless network, or the like.

The processor 400 typically executes applications software stored in memory 401 to allow content to be presented, as well as to monitor sensors and determine when a trigger event has occurred, as will be described in more detail below.

Accordingly, it will be appreciated that the presentation device 203 may be formed from any suitable device, such as a suitably programmed PC, Internet terminal, lap-top, hand-held PC, multimedia player, MP3 player, MP4 player, mobile phone, iPod, or the like, which is typically operating applications software to enable data transfer and in some cases web-hosting and file transfer protocol (FTP) functionality.

An example of the process of creating content for presentation and then allowing this content to be presented to users will now be described in more detail with reference to the examples in FIGS. 5 to 9.

Figure 5:
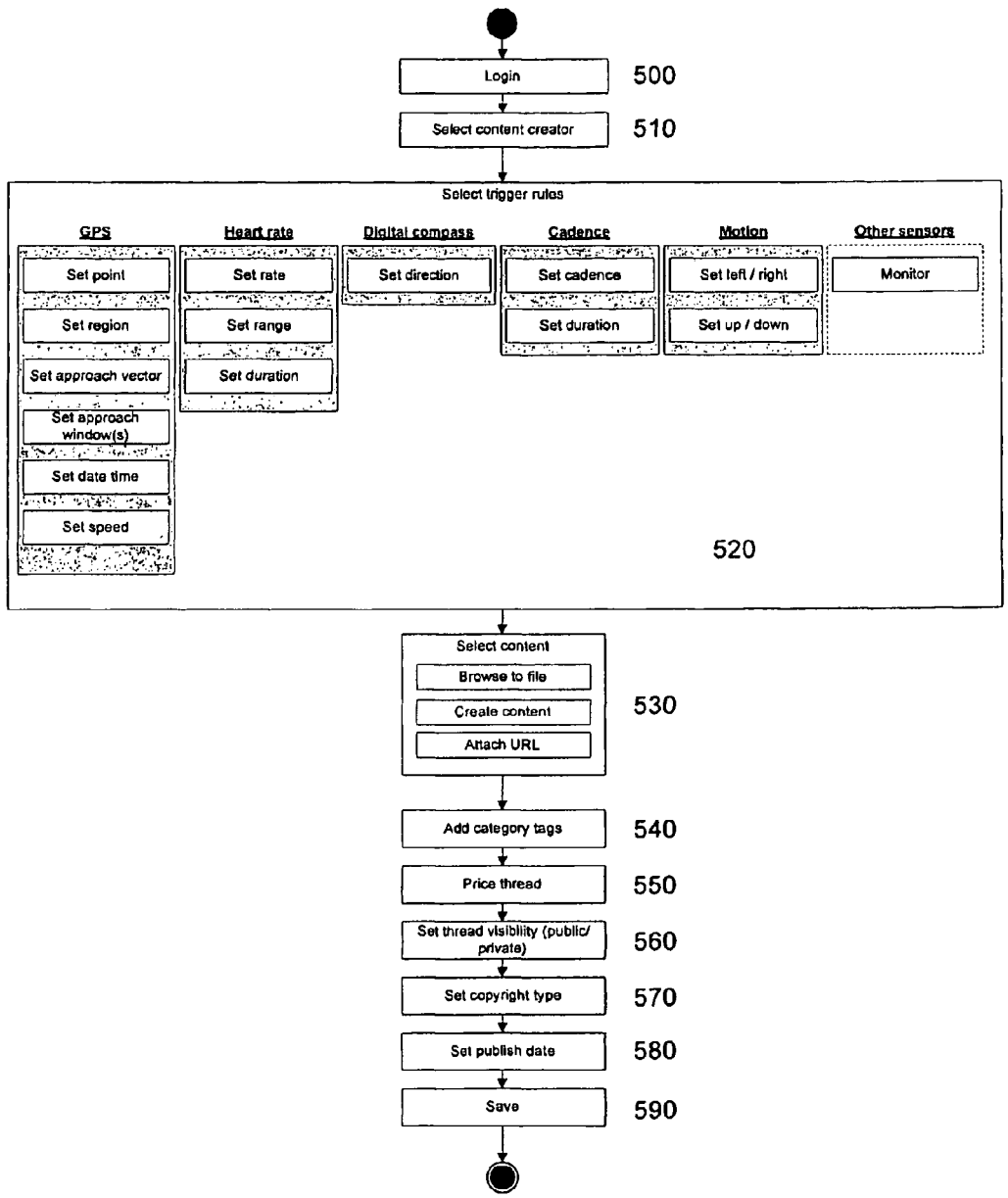
FIG. 5 is a flow chart of an example of a process for creating content and associated trigger rules.

FIG. 5 shows a process for allowing content to be created. For the purpose of this example, content including at least one content instance is associated with a respective trigger rule, which defines the event criteria representing the conditions under which the content instance should be presented. In general two or more event criteria are provided, each typically being associated with a respective condition, so that content is only presented if each of the event criteria are satisfied. The event criteria may be provided in sequence so that each of the event criteria need to be met in a particular order, or alternatively, the event criteria may be unordered. The content and metadata or similar, which define the associated trigger rule, are typically referred to as a thread.

In this example, at step 500 it is typical for a user of one of the end stations 205 to access a website, or other online environment hosted by the base station 201, using suitable applications software, such as a browser application provided on the end station 205. The user may then login to the website to allow content to be created.

It will be appreciated that this is not necessarily required depending on the preferred implementation. Thus for example, the entire process could be performed entirely using the end station 205 if suitable applications software is implemented thereon.

At step 510 the user selects a content creator option, which may be indicated by a suitable icon or other input indication on the website. The browser application implemented by the user end station 205 can be transferred to a web page that provides a content creation mechanism, allowing the user to create content using the following process.

Typically each trigger rule includes event criteria defining a plurality of conditions, so that presentation of the content can be triggered when the sensors indicate that each or selected ones of the conditions are satisfied. In one example, different types of event criteria are associated with respective types of sensor, so that sensor data from a respective sensor is compared to the corresponding type of event criteria.

Thus, for example, each trigger rule can include event criteria relating to location or movement information so that presentation of the content can be triggered based upon the location or movement of a user as derived from appropriate position or movement sensors. Thus, the content may include tour guides, motivational information for competitors in sporting or orienteering events, or the like.

The conditions may also be indicated in any one of a number of manners, but typically this involves having defined thresholds so that trigger can occur when sensor data from corresponding ones of the sensors indicate that the threshold has been reached and/or breached. Thus, the positional information could be in the form of an absolute location, so that the threshold is deemed reached when the user is at the respective location, or in the form of a region, so that the location requirement is satisfied when the user enters the region.

Accordingly, the end station 205 presents the user with a graphical user interface that allows a user to define the event criteria for respective ones of the sensors. It will be appreciated that this may be achieved using any one of a number of mechanisms depending on the nature of the event criteria. Thus, where the event criteria are position based, the end station 205 can display maps which can be manipulated by the user utilising suitable input commands or the like, allowing positions to be defined, as will be described in more detail below.

At step 520 the user uses the graphical user interface to define or otherwise select a trigger rule to be associated with a respective piece of content, or a respective content instance.

Examples of this will now be described with reference to FIGS. 6A to 6L, which are screenshots of an example graphical user interface associated with a creation tool used in creating content. In one example, the graphical user interface is implemented by the base station 201 and displayed to the user using the end station 205 or the presentation device 203 using appropriate browsing software. However, this is not essential and any suitable mechanism may be used, such as having the end station 205 or the presentation device 203 execute applications software to allow a creation tool to be implemented locally.

Figure 6A:
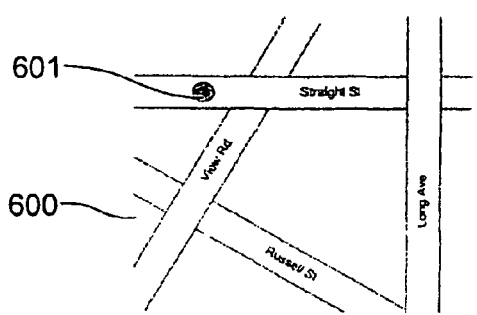
FIGS. 6A to 6L are schematic diagrams of example graphical user interfaces used in creating trigger event criteria.

In the example of FIG. 6A the graphical user interface includes a map 600 which is used to allow a location indicator 601 to be placed thereon. The location indicator 601 corresponds to a position event criterion indicating that the presentation of content should be triggered when the user is on or near the junction of Church Street and Commercial Road as shown in FIG. 6A. The location indicator could be provided in any one of a number of suitable manners, such as providing a grid reference, or GPS position indication, or by dragging and dropping the indicator onto the map using suitable input commands. In this example, if no other event criteria are defined, then the trigger rule will indicate that the trigger event has occurred when sensor data indicates the user has reached the indicated position or is within an area or a distance associated with the position.

Figure 6B:
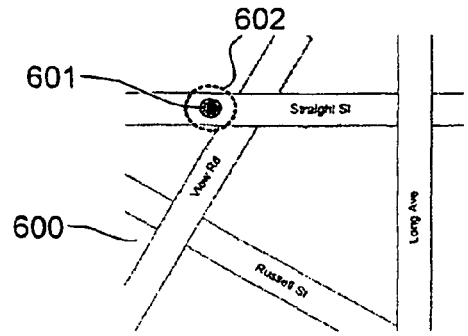

In FIG. 6B, a region indicator 602 is added surrounding the above described position. In this instance, the region event criterion is satisfied if the user enters the region surrounding the position shown in FIG. 6A.

In one example, the position and region event criteria can be used to define two trigger rules, each of which triggers the presentation of a respective content instance. Thus, if the content is in the form of directions to a specific location, when the user enters the region, a first trigger event can be determined to provide an indication that the user is nearing the location, with a second content instance being triggered when the user reaches the position, indicating that the user has arrived. Alternatively, the event criteria can form part of a single trigger rule. Alternatively, the position indication may be used merely to indicate the position of the centre of the region.

Figure 6C:
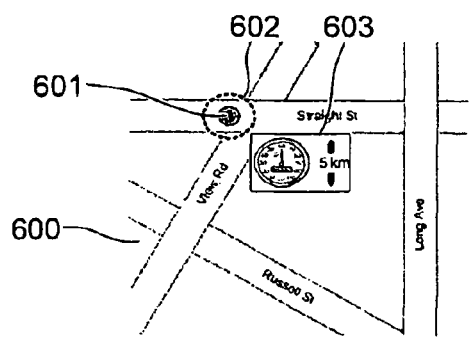

However, in general, the user selects multiple event criteria for a given trigger rule, which must be performed in conjunction, or in sequence, for the trigger rule to be satisfied and a trigger event determined. In one example, providing a sequence of event criteria is a process known as chaining. The following outlines several examples of content activation through event chaining:

a certain point in space is reached
  a certain point in space is reached at a certain speed
  a certain point in space is reached from a general direction/
    along a given vector
  a certain point in space is reached on a certain day of
    year/range of days of year
  a certain point in space is reached at a certain time
  a certain point in space is reached after a certain duration
    from a start time
  a region is entered
  a region is entered and outside temperature is X
  a heart rate reaches a certain threshold
  a heart rate is within a range and a point in space is reached
  a heart rate is exceed whilst the elevation is increasing
  speed is falling at a certain rate whilst elevation is increasing and is expected to increase further over a period Thus for example, the user could further select a speed event criterion by adding a speed indicator 603, as shown in FIG. 6C. In this example, the speed event and region event criterion are chained so that a trigger event is determined if the user enters the region at, above or below an indicated speed.

Figure 6D:
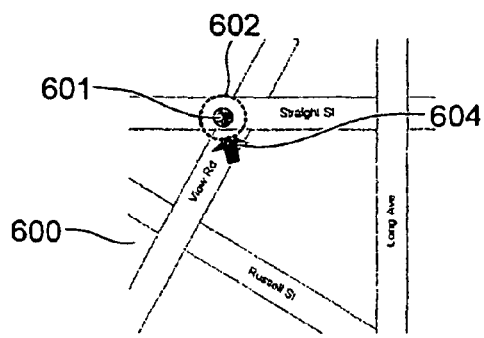
Figure 6E:
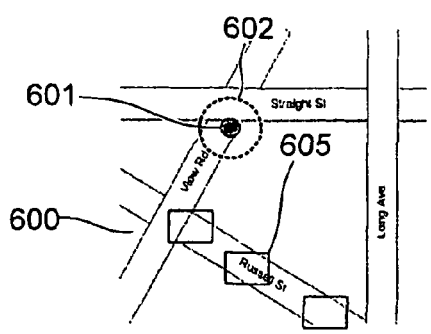

In FIG. 6D, a bearing indicator 604 is used, so that a trigger event is determined if the user enters the region along a specified bearing. In FIG. 6E, a set of approach window indicators 605 are provided, so that a trigger event is determined if the user enters the region through the specified windows. These options could be used to ensure that the user enters the region from a certain direction.

Figure 6F:
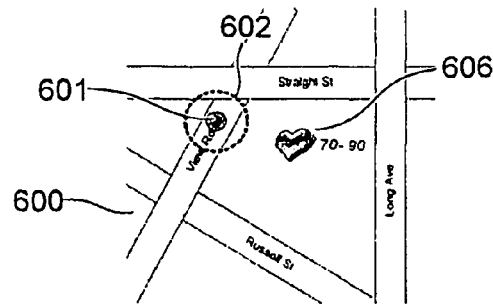
Figure 6G:
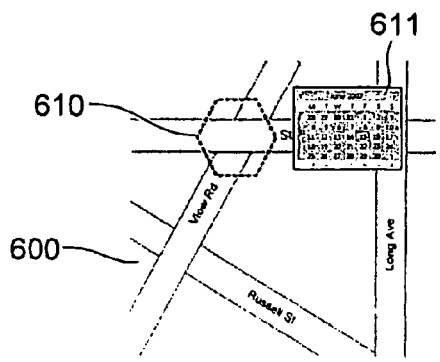
Figure 6H:
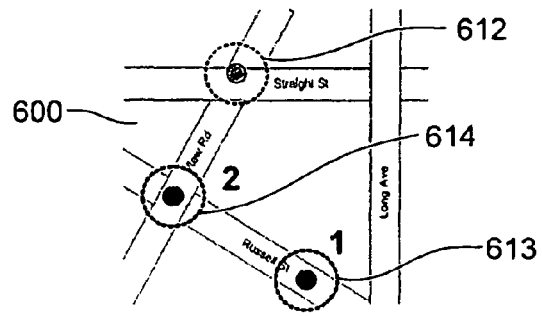
Figure 6I:
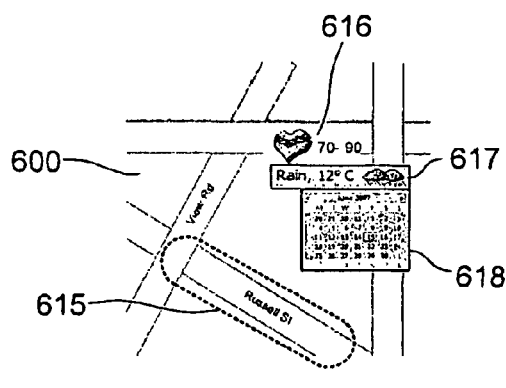
Figure 6J:
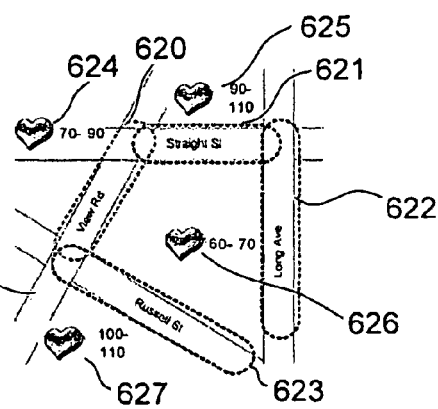
Figure 6K:
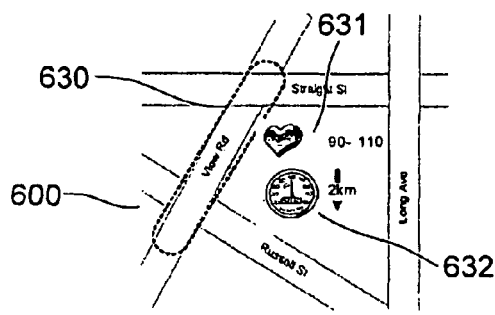
Figure 6L:
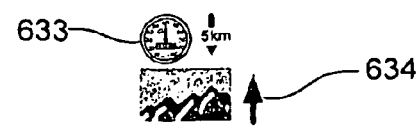

In FIG. 6F, a heart rate indicator 606 is used, so that a trigger event is determined if the user enters the region with a heart rate at, above or below an indicated rate. This could be used for example to stimulate the user into increasing their performance if participating in a sporting event. Accordingly, at this instance the user is effectively defining a sequence of events, which if satisfied represent a trigger event. For each of the events the process defines criteria which if satisfied indicate that the event has occurred.

Further examples are shown in FIGS. 6G to 6L. These include:

- an area indicator 610 and date or time indicator 611 so that a trigger event is determined if the user is within the area on a specified date or at a specified time;
- region indicators 612, 613, 614 so that a trigger event is determined if the user enters the region 612 after passing through the regions 613, 614 in sequence;
- an area indicator 615 is chained with a heart rate indicator 616, a weather indicator 617 and a time/date indicator 618 so that a trigger event is determined if the user is in the area with the specified heart rate, on the specified date with the specified weather conditions;
- area indicators 620, 621, 622, 623 are provided with corresponding heart rate indicators 624, 625, 626, 627 so that the same content can be activated when the user is in any one of the areas with the specified corresponding heart rates;
- an area indicator 630 is provided with a corresponding heart rate indicator 631 and a speed indicator 632 so that content can be activated when the user is in the area with the specified heart rate and the user's speed is decreasing at a given rate; and,
- an elevation indicator 634 is provided with a corresponding speed indicator 633 so that content can be activated when the user's elevation increases and speed decreases at the indicated rates.

It will be appreciated that the above described examples are for illustrative purposes only and are not intended to be limited.

Once the trigger rule has been defined, the user will typically provide an indication of this by selecting an appropriate input option on the content creator page, causing the base station 201 to prompt the user to provide details of content and further optional information, as set out below.

At step 530 the user will typically select content associated with the defined trigger rule. The content will typically be selected by allowing the user to browse one or more storage locations to locate a file containing the content. This file may be stored locally on the end station 205 or remotely on the base station 201, or one of the presentation devices 203, depending on the particular circumstances. Alternatively, this could be achieved by having the user create the content or by providing a URL (Universal Resource Locator) that directs a system to the content. Optionally, the user may also select a notification method to be used to indicate that the content is to be presented This can include any suitable notification method, such as device vibration or lights turning on, dependent on playback device capabilities. Additionally, or alternatively, the notification methods may be set using the presentation device, as will be described in more detail below.

At step 540 category tags can be provided to indicate a category for the particular thread, which is formed from the content instance and the associated trigger rule. The tags can be used to allow users to perform searching to locate threads of interest. This can be achieved using any suitable method, such as keyword searching, content filtering based on a predefined user created profile, or the like, as will be described in more detail below. Tags may be selected by having the user define new tags, or select existing tags from a drop down list or the like.

At step 550 the user optionally defines a price to be associated with the content, allowing some form of revenue to be collected from presentation of the content. The price will typically be in the form of a monetary value, although any other suitable form of price may be used. The price may also place a restriction on the number of times the content can be displayed.

At step 560 the user can select a visibility associated with the thread, such as public, in which the content is available for any user of the system, or private in which the content is only available to one or more selected users. Thus, for example, this allows a user posting content threads to specify that the thread should only be made available to users of a predefined social network, such as "friends", "travel companions", "sporting event competitors", or the like.

At step 570, the user can select copyright terms to be associated with the content thread. This can be used to further control the distribution of the content, for example by limiting the manner in which the content thread may be used, or limiting the number of copies of the content thread that the user can make. It will be appreciated that a range of different standard copyright terms can be used, including for example, allowing the user to add the content thread to a Creative Commons, or the like.

A publication date or other information may be then set at step 580, allowing aspects of the publication to be controlled. For example, this may control the duration for which the content may be stored on a device for presentation, or the date or duration for which the content thread is made available for download. Other publication options could also be controlled in this manner as will be appreciated by persons skilled in the art.

It will be appreciated that throughout the above described process, the base station 201 communicates with the device used by the user, which could be the end station 205 or the presentation device 203, allowing the trigger rules and other information to be defined. This is typically achieved by having the user provide input commands to the end station 205 or presentation device 203, which allows an indication of selected trigger rules, content and other information to be transferred to the base station 201. This in turn allows the base station 201 to create and save the content and any associated trigger rules as part of a save process that is typically implemented at step 590.

During the save process, the base station 201 will generate metadata which describes the triggering rules required to activate the content. A thread is then generated including any content instances to be presented and either embedded metadata, or a reference to separately stored metadata. Thus, the thread is formed from a combination of traditional content types (audio, text, picture, and video) and sensory metadata, which is either embedded within the content itself or defined within a separate data file.

Figure 7:
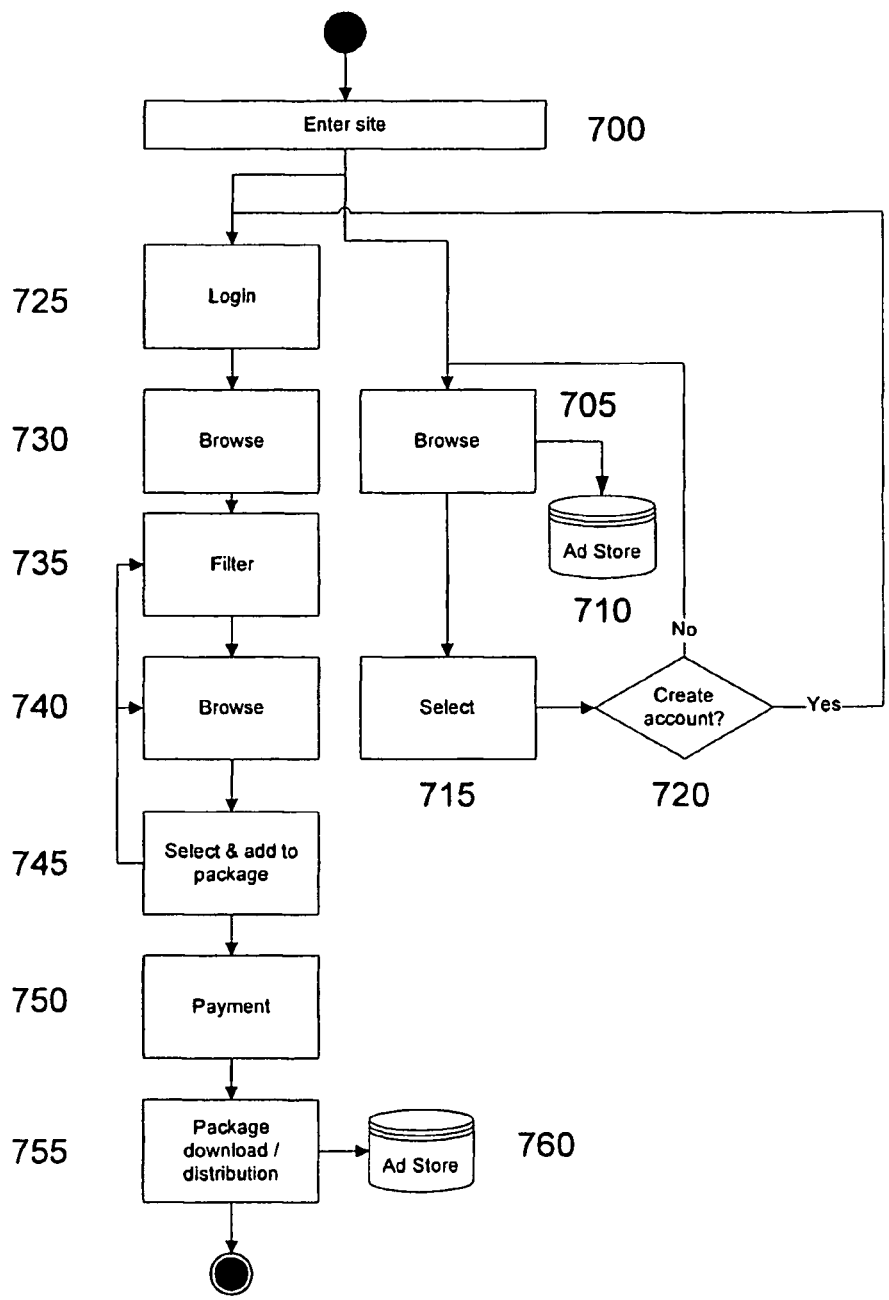
FIG. 7 is a flow chart of an example of a process for creating a content package.

An example of the process of packaging threads to allow multiple threads to be accessed will now be described with reference to FIG. 7.

At step 700, the user uses the end station 205 to access a website, or other online environment hosted by the base station 201. If the user is not previously registered with a site, then at step 705 the user is able to browse the site during which time advertisements will typically be presented to the user from an advert store shown generally at 710. This is however optional and may not be required in some implementations.

At step 715 the user selects an option and the base station 201 will determine if this is a create account option. If not the process will return to step 705 to allow further browsing, otherwise at step 720 an account is created. This may be achieved in any one of a number of manners and this will not therefore be described in further detail.

Once an account has been created, the user can login to the account at step 725, for example by providing an appropriate username and/or password. This will typically be performed in accordance with standard user verification protocols.

At step 730 the user is able to browse content threads available on the site. The content may be presented in any one of a number of manners, including for example, displaying a list including a title or other details relating to the content. Alternatively, an example of the content, such as a clip or thumbnail, can be displayed.

As part of this process the user may select a filter at step 735 and apply this to available content to reduce the amount of content viewable. It will be appreciated that this may be performed in any one of a number of manners. In one example, this can be achieved by performing searching of the content for example by using predefined user created profile, keywords or general categories to identify threads of interest using the associated tags. At step 740 the user can continue to browse and refilter at step 735 if required until content threads of interest have been identified.

Alternatively, at step 745 once the user has located desirable content, the user can select the content for download. The content is typically provided in the form of a package which includes not only the content to be presented, but also the associated event threads representing the trigger rules, which allow presentation of the content to be controlled.

At step 750 the user is typically required to provide some form of payment. Payment may be made in any one of a number of ways, such as by making a credit card payment, by using a payment account, or the like. Additionally, and/or alternatively, payment may be made wholly, or in part, by viewing second content, such as adverts or market surveys. These may be provided as part of the package as shown at step 760, and as will be described in more detail below.

At step 755 the content package can be streamed to the end station 205, or the presentation device 203. Alternatively, the content package may be downloaded to the presentation device 203 directly, or via the end station 205, thereby allowing the presentation device 203 to store the content locally for playback. This provides a number of advantages. For example, in some locations access to the content may be restricted, for example due to available bandwidth or cost restrictions. A further advantage is that this may allow the content to be reused on a regular basis without multiple charging.

Figure 8:
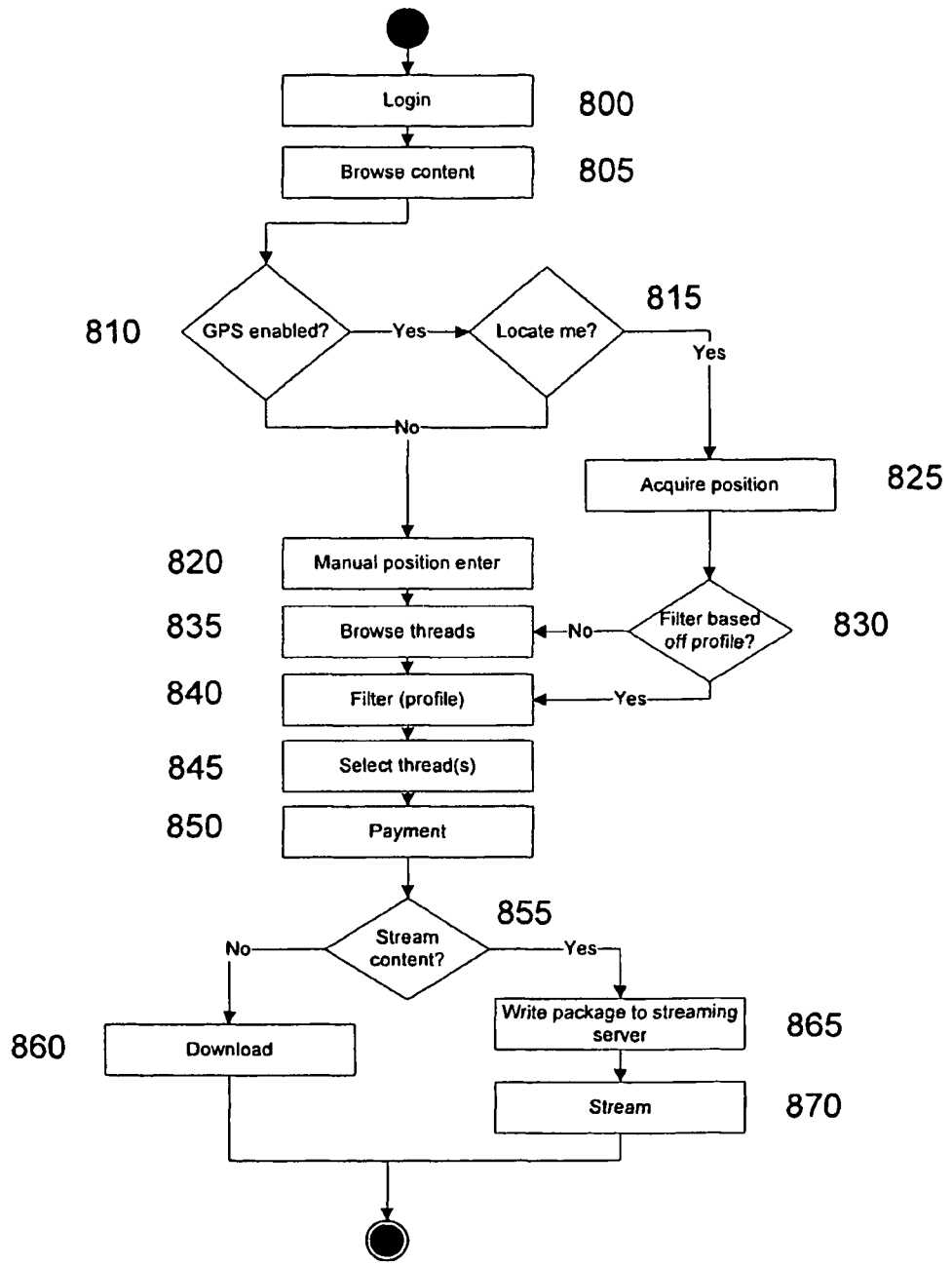
FIG. 8 is a flow chart of an example of a process for selecting content for presentation.

An example of the process of allowing a mobile user to create content packages and download them will now be described with reference to FIG. 8.

At step 800, the user uses the presentation device 203 to login to a website, or other online environment hosted by the base station 201. At step 805, the user uses the presentation device 203 to browse content hosted by the base station 201. At step 810 the base station 201 can determine if the presentation device 203 has GPS or another position sensing system enabled. If the GPS is enabled, then the user may be provided with the option of allowing the base station 201 to automatically detect the user's location using information from the presentation device GPS system.

If the GPS is not enabled, the user declines the automated location detection, or for some reason the presentation device 203 cannot locate the user, then the user will typically be requested to manually input the position at step 820.

In the event that the user provides permission for automated location detection, then at step 820, the base station 201 acquires the user's position from the GPS system at step 825. The base station 201 will then allow the user the option of selecting or otherwise browsing content using searching or other filters at step 830. If filtering is not performed, then the user will typically be presented with details of all available threads relevant to the required position at step 835. Otherwise, or following this a filter can be applied allowing a filtered set of results to be provided at step 840. The content may be presented in any one of a number of manners, including for example, displaying a list including a title or other details relating to the content. Alternatively, an example of the content, such as a clip or thumbnail, can be displayed.

At step 845 the user selects threads of interest, and provides an indication of a payment method at step 850, using appropriate input commands supplied via the presentation device 203. At step 855 the base station 201 prompts the user to indicate if the content is to be downloaded or streamed. If the user selects to download the content, then the content is downloaded to the presentation device otherwise at step 860, otherwise the base station 201 provides a package containing the selected threads to a streaming server allowing the content to be streamed at step 870.

Figure 9:
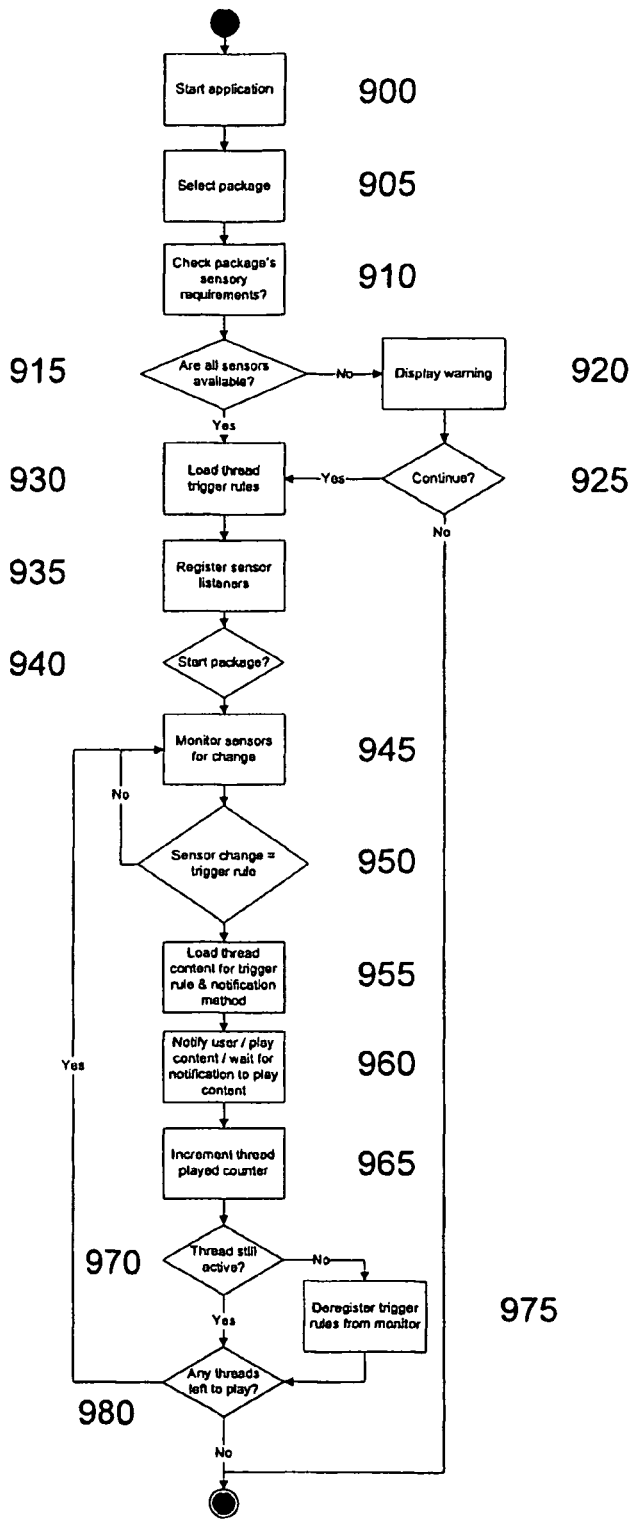
FIG. 9 is a flow chart of an example of a process for presenting content.

A mechanism for allowing a presentation device 203 to present content will now be described with reference to FIG. 9.

In this example, at step 900 the user utilises the presentation device 203 to execute any required application software needed to present the content. At step 905 the user will typically select any one of a number of available packages for presentation. This can be achieved by selecting a package for streaming using the process described above with respect to FIG. 8. Alternatively, this can be achieved by browsing locally stored packages downloaded from the base station 201 using the processes described above with respect to FIG. 7 or 8.

At step 910 the presentation device 203 will review the package and determine the sensory requirements associated with the package. This is typically achieved by parsing the metadata stored within the thread to determine the types of event criteria that form part of the trigger rule. This can then be used to determine the sensors required using any suitable technique, such as by accessing a mapping stored in the memory 401. Thus for example, if the package includes a requirement for GPS position information, the presentation device 203 will determine if a GPS enabled positioning system is active.

At step 915 if it is determined that all the sensors are not available then the presentation device 203 displays a warning at step 920 allowing the user to select whether the process should halt or continue at step 925. In the event that the process is halted, then the process will simply end.

If the process is continued, or if is determined that all of the sensors are available at step 915, then the presentation device 203 loads the thread trigger rules from the package into the memory 401 at step 930. At step 935 the required ones of the sensors 410, . . . 415 are optionally registered to allow these to be monitored by the presentation device 203.

At step 940 the presentation device determines if the package has started and if not it will await package start, which is typically performed following a suitable input command from the user.

Once the package has been started at step 945 the presentation device 203 will monitor the sensors 410, . . . 415 to determine any change in status. This is typically achieved by having the presentation device 203 periodically receive sensor data from the sensors 410, . . . 415, and examine the sensor data for any changes.

If a change in sensor data is detected, the presentation device 203 will operate to compare the current sensor status to each of the trigger rules associated with the package to determine if a trigger event has occurred. Thus, typically the presentation device will compare sensor data from each of the sensors to the event criteria defined in the metadata for each of the trigger rules, to thereby determine if each of the event criteria and hence the corresponding trigger rule are satisfied.

If it is determined that no trigger rule is satisfied, and hence that a trigger event has not occurred, then the process returns to step 945 to monitor the sensors for any change in status. Otherwise, at step 955, the presentation device 203 will load the respective content associated with the respective satisfied trigger rule, together with any associated notification method indication.

The notification methods may be preset according to device settings, or may be set based on user options associated with the content, or defined by the user. A number of different notification methods may be used as set out in Table 2 below.

TABLE 2

| Action | Description |
| --- | --- |
| Automatic content play | Content will be played by device as soon as trigger is activated |
| Device vibrate | Device will vibrate and display a message to the user asking if they wish to activate the content. (Device specific) |
| Device external speaker notification (beep/ring) | Device will beep or ring to notify the user of an onscreen message asking them to activate content. (Device specific) |
| Device indicator light activation | Device's external notification light will turn on to indicate message onscreen asking user to activate content. (Device specific) |

The use of notification methods allow the presentation device to notify the user that the content is ready for presentation, or alternatively play the content automatically, depending on the selected settings.

If the user acknowledges the notification, or if the content is to be presented automatically, then the presentation device 203 access the respective content instance associated with the satisfied trigger rule, and causes the content to be presented. This may be achieved in any one of a suitable number of manners, such as by displaying video information on a screen, or presenting audio information via a suitable audio system.

Once the content has been presented a thread played counter is incremented at step 965 before the presentation device 203 determines if this thread is still active at step 970. The thread may become inactive if the trigger rule has been satisfied and the content instance has been presented, or if the content instance has been presented a certain number of times.

If the thread is not still active, then at step 975, the presentation device 203 deregisters the associated trigger rule from the monitor. Once this is completed, or if the thread and hence the respective trigger rule remains active, then the presentation device 203 determines if there are any threads left to play. If so the process returns to step 945 to continue monitoring the sensors. Otherwise the process ends.

Accordingly, it will be appreciated that this provides a mechanism to allow content to be presented to a user. In particular, the above described processes allow for the creation of multi sensory and potentially chained activation of content, allowing content to be provided to the user in a contextually relevant manner.

The mechanism allows content to be downloaded as a package and stored locally on a presentation device allowing selected content instances to be presented when corresponding trigger rules are satisfied and the trigger events are therefore determined to have occurred.

Alternatively, the above described process can be performed with the thread being streamed from a streaming server, such as the base station 201. This can be performed in any one of a number of ways.

In one example, the sensor data determined from the sensors is uploaded to the base station 201 to allow this to be compared to the trigger rules, allowing the base station 201 to determine if a trigger event has occurred. In this case, the content instance can then be pushed to the presentation device 203, with the presentation device operating to the display the content, or generate a notification as required. This can be advantageous as it can reduce processing requirements on the presentation device 203, which is useful when the presentation device has limited processing capabilities. This can also be used for situations in which content should be secured prior to presentation. Thus for example, in a treasure hunt style game or competition, it may be desirable to only allow content such as a next clue to be presented once it is determined that a previous clue has been satisfied through the use of an appropriate trigger rule. This avoids users attempting to extract subsequent clues from downloaded content, thereby helping to reduce cheating.

In a further alternative, the metadata representing the trigger rules can be downloaded to the presentation device 203, with the presentation device operating to determine if a trigger event has occurred. In this instance, any content instances required can then be downloaded from the streaming server as required. This can be advantageous as it can reduce the amount of content that is downloaded, particularly in situations where not all content in a thread is usually used.

It will be appreciated that by providing trigger rules associated with different content instances, this allows a content instance to be presented each time trigger rules are satisfied. Furthermore, by forming each trigger rule from a sequence or chain of events defined using event criteria, this allows the system to present the content only when multiple independent even criteria are satisfied. This vastly enhances the interactivity associated with the data and makes the data more relevant to the user when it is presented.

Accordingly, the above described process allows multiple sensors to be used to trigger the presentation of content instances. This can be achieved using a wide range of systems, such as a mobile phone equipped with a media player, GPS receiver and other sensory devices such as temperature gauges, heart rate monitors, clocks or timers, and accelerometers.

This allows the above described process to provide contextually triggered content referred to as Event Driven Content (EDC) by mixing sensory based triggering rules with traditional content types. This sensory information can be derived from a range of sensors both internal and external to the device.

Associating metadata defining trigger rules with content and storing this as a thread allows the content to have a defined event scenario so that the content can be automatically presented using a compatible software player. Thus, threads are typically formed from a combination of traditional content types (audio, text, picture, and video) and sensory metadata, which can be either embedded within the content itself or defined within a separate data file. A piece of software will read this metadata, monitor a set of sensors and activate the content when pertinent. This provides the ability to chain (either in sequence or parallel) a diverse group of sensory inputs together to further enhance this activation process.

Content is generally consumed on a mobile device which utilises either internal or external sensors to trigger content. The device typically includes at least a screen to display text however a standard configuration would also include a media player able to serve industry recognised audio formats including MP3, OGG, WAV, AAC, M4A, WMV amongst others. More advanced devices will implement some type of rich screen such as LCD, OLED or newer ePaper variants including Cholesteric Liquid Crystal, Electrochromic, Bichromal beads and Electrophoresis.

In one example, the process allows a device to load a package of content, extract required sensor information, determine if sensors are present and notify the user if not. Once the package is activated the device polls sensors for changes which may match the triggering rule. If a match is found then the content is loaded and potentially played to the user. Finally the content (Thread) is checked to see how many times it should be activated and if the total number of times has been reached then the triggering rule is deregistered from the monitor.

It will be appreciated that this process has a wide range of applications including in markets such as the travel and fitness industries. Currently a traveller reads a travel guide or hops on a tour bus to learn more about a travel destination, whereas the above described processes can be used to allow a tourist to create their own travel package and experience it through content which is contextually aware and able to activate itself when appropriate.

Likewise in the fitness industry, currently most training and competition aids only provide an athlete basic textual information at the time of training via a watch or display of some sort. There are GPS enabled solutions on the market however these only capture telemetry data for post analysis. The above described process could be used to enhance the athletes training experience by providing motivational and training aids through content such as 'pre canned' voice prompts providing them with motivational content whilst training. For example, serving motivational content to a competitor in the New York Marathon. In addition to serving content regarding the runner's pace, the heart rate can be monitored to serve content related to proper breathing, as well as motivational cues depending on location or neighbourhood, and duration for which the user has been participating, for example.

The process can be used to allow developers or community members to create content via an online creation tool, with the content being publishable to a distribution platform where users can browse, filter, select, purchase and download content. Finally, the process can allow users to consume this content on mobile devices. It will be appreciated that further options can be permitted such as allowing users to rate consumed content, create new content and potentially sell back to operator of the base station 201 their travel flow data.

An example of the process for charging for content presentation will now be described with reference to FIGS. 10 and 11, which show the process and basic screen flow presented to the user.

In this instance, when a user has selected content for download, for example using the processes described above with respect to FIG. 7 or 8, or any other suitable process, the base station 201 will calculate a gross value for the content at step 1000. The manner in which this is achieved will depend on the preferred implementation. Typically, any price information will be stored together with the content, for example in the database 210, thereby allowing the price to be determined by the base station 201. Thus, for example, if the content includes threads, the gross value can be determined by simply adding together the price associated with each thread, which can be specified at step 560 if the thread is created using the process of FIG. 5.

The base station 201 will then calculate any discounts to be associated with the content at step 1010. This process is typically performed by having the user use the end station 205 or the presentation device 203 to access a web-site or other online environment hosted by the base station 201. The base station 201 can then present a page via the end station 205 or presentation device 203 which indicates to the user the gross value of the content, and asks whether or not the user is willing to pay the full price (in other words the gross price) at step 1100.

At step 1020 the base station 201 determines if the user has selected to pay the full price or vary the content price. If the full price is not selected, then the base station 201 determines a variance in the form of a charge balance representing the difference between the gross value and an amount the user is willing to pay, at step 1030. To achieve this, the base station 201 displays a page requiring the user to indicate the amount they are willing to pay at step 1110.

Once the charge balance is determined, at step 1040 the base station 201 then determines second content, in addition to the content requested by the user, which is typically in the form of content provided by third parties, such as advertising, market surveys, or the like. The presentation of this second content to the user allows the operator of the base station 201 to collect advertising revenues, or the like, thereby allowing the opportunity to recoup the charge balance.

Thus, for example, if Consumer A would like to purchase content with a deemed value, V. but would prefer to pay price P for this content where P=V−T. The base station 201 can offset the variance, T, with third party content.

In one example, to make the second content more relevant to the user, the base station 201 uses a user profile and third party content analysis system to determine content options that can then be presented to the user at step 1050. The user profile may be created at any time, such as during registration with the base station 201, or the like, and typically includes an indication of content preferences, such topics of interest. This allows the base station 201 to search available content and locate second content that may be of relevance to the user.

Having selected second content, the base station 201 can determine a number of different options for the presentation of the second content. This can include, for example, providing options to select different packages, such as one of adverts or one of market surveys. Different content may also be selectable, as well as packages of different value.

At step 1120 the base station 201 provides details of the options allowing these to be displayed to the user using the end station 205 or the presentation device 203, allowing the user to select the required option package. The base station 201 determines the selected option package at step 1060. Once a discount package has been selected, or if the user is paying the full price for the package, the base station 201 causes an indication of the selected option to be displayed to the user at step 1130, allowing the user to confirm the selected option is correct.

At step 1140, the base station 201 provides a request for payment to the end station 205 or the presentation device 203, allowing this to be displayed to the user. The user can enter payment details, with this being used by the base station 201 to confirm the payment is valid at step 1080 and the purchase is complete.

At step 1080 the base station 201 creates an appropriate script, allowing the created package to be downloaded or streamed to the end station 205 or presentation device 203. At step 1150, the base station 201 indicates that the package is ready for downloading or streaming, allowing the content to be presented.

Figure 12:
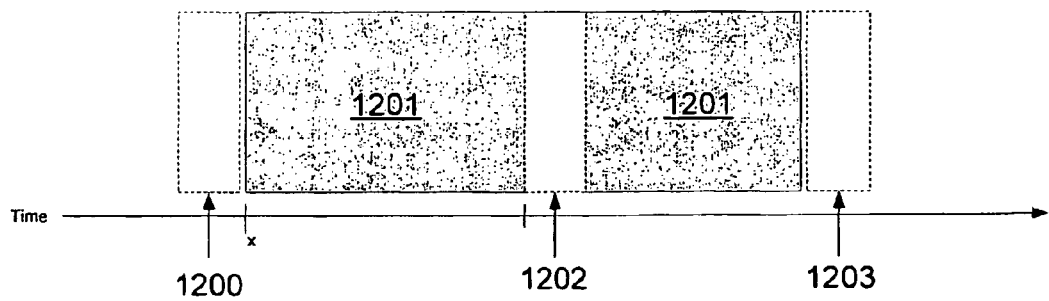
FIG. 12 is a schematic diagram of examples of content presentation options and options for injecting third party content.

In one example, the second content can be integrated into the package downloaded onto the user's end station 205, or presentation device 203. An example of this is shown in FIG. 12, in which the content and second content are positioned any one or more of with:

second content 1200 before the content 1201;
second content 1202 after the content 1201; and,
second content 1203 within the content 1201 at some specific time interval.

Alternatively, the package could be downloaded, with the second content being injected into the content when the package is presented. This can be achieved by positioning the second content randomly. Alternatively specific placement can be used through use of additional metadata such as a mark-up language document. In such a case descriptive information indicating potential positions for third part content injection are defined in a document or data repository of some type.

Figures 10, 11:
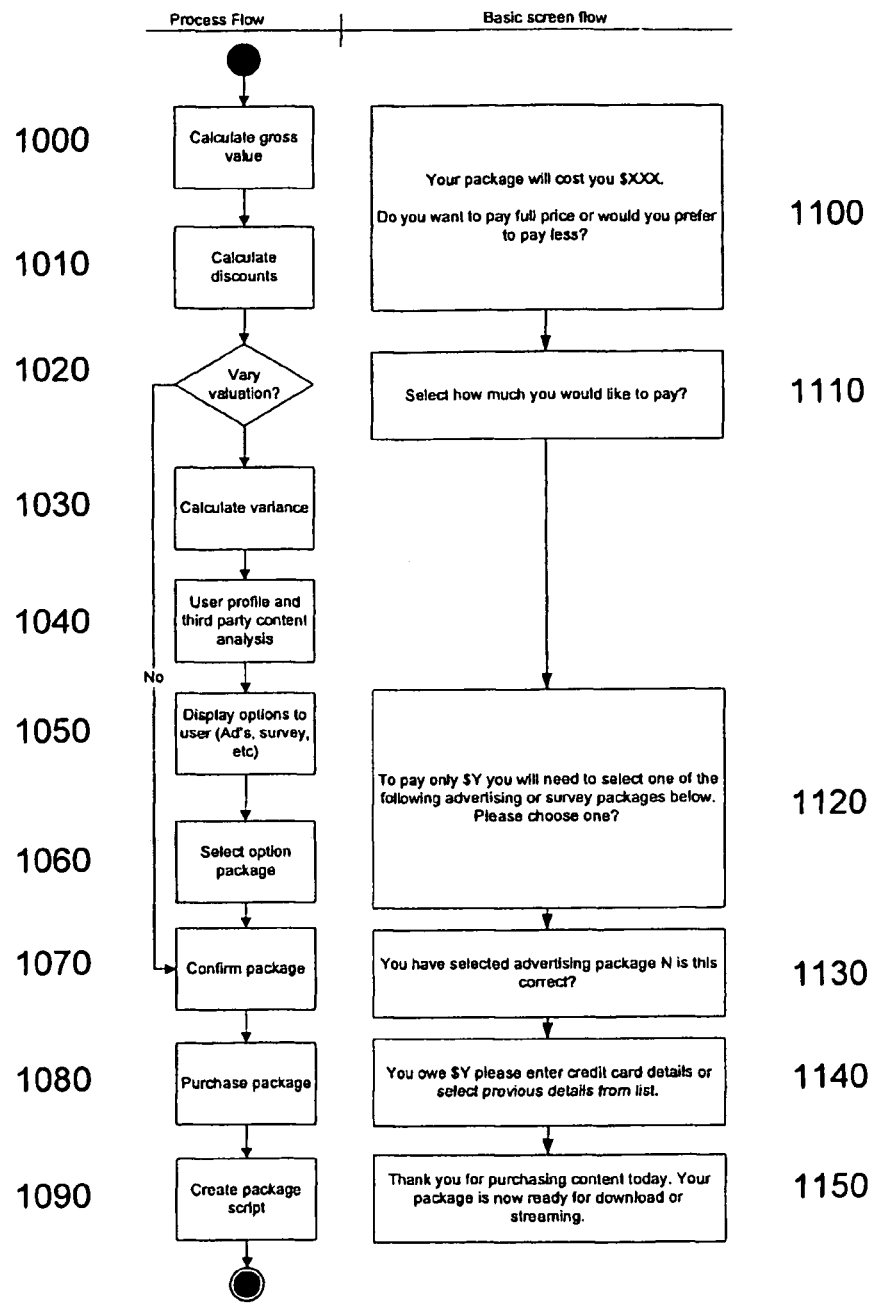
FIGS. 10 and 11 are flow charts of an example of a process for charging for content.

The example of FIGS. 10 and 11 allows consumers to vary the price of a given piece of content during the purchase phase. This model can be utilised not only with the aforementioned Event Drive Content but also with more traditional channels such as movies on demand/IPTV services. In theory any media channel could utilise such a service where there is:

A return path available (i.e consumer to provider communication channel) and,
At least one of:
Enough bandwidth to stream individual content or
Intelligent end devices (Set Top Box) able to receive a standard stream of content and inject third party content at point of consumption.

When the user enters the purchase phase of a sale, the above described process can be used to give the user the opportunity to state what they would like to pay for content. This ranges from nothing to the full price stated at the outset. The variance is offset automatically by third party content. If there are several options for third party content the system will offer the user the ability to select one from a list.

Furthermore, in one example, third party content selected by the user to offset a price variation can be targeted based off user profile information. Such content could be advertisements, surveys or any other material deemed valuable to a third party. If there is more than one option for third party content the user is can select the option which suits them best.

This changes the pricing dynamic between Seller and Buyer by affording the Buyer greater pricing control, both parties are assured maximum price advantage. The Seller is assured of not losing Buyers due to poor pricing decisions and the flexibility afforded the Buyer leads to greater satisfaction and builds loyalty.

Figure 13:
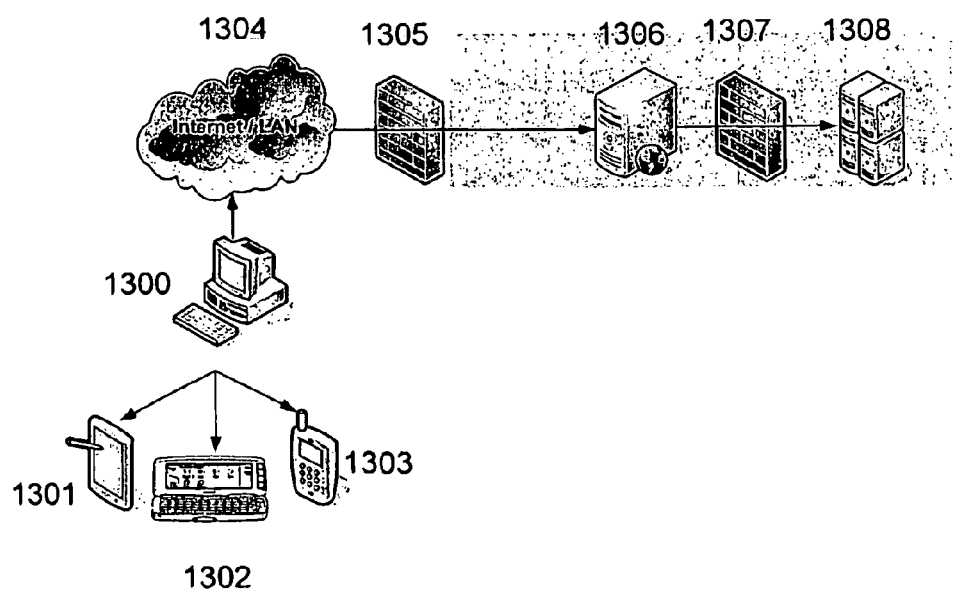
FIG. 13 is a schematic diagram of an example of a network architecture for presenting content.
Figure 14:
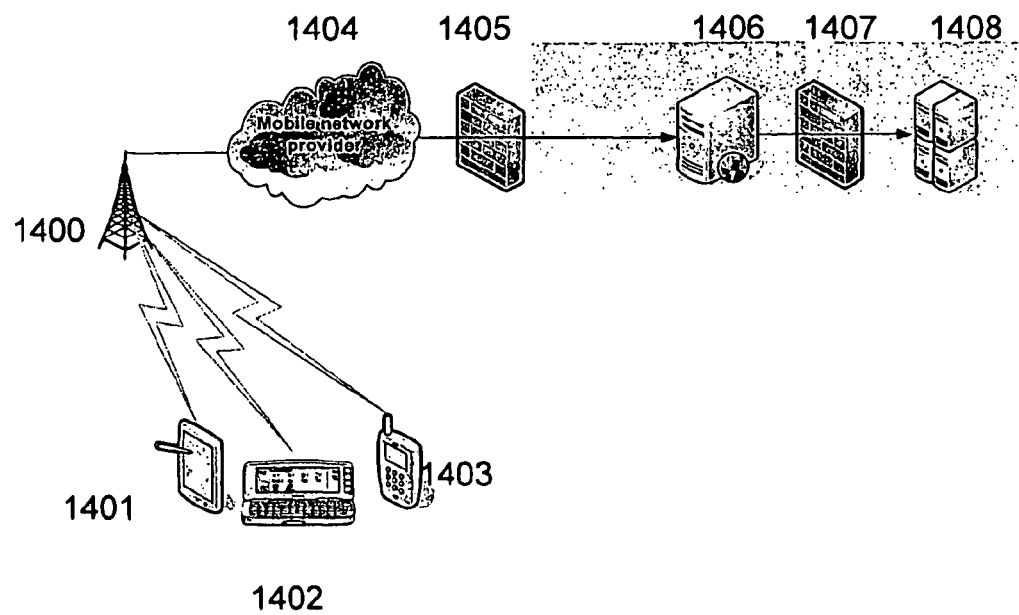
FIG. 14 is a schematic diagram of a second example of a network architecture for presenting content.

Specific examples of network and server architectures that can be used for implementing any one or more of the above described process are shown in FIGS. 13 and 14 respectively.

In FIG. 13, the system includes an end station 1300, such as a personal compute or the like, coupled to a presentation device such as a PDA 1301, smartphone 1302, mobile phone 1303, or the like. The personal computer 1300 is connected to a network 1304, such as the Internet or a LAN, which is in turn connected to a web server 1306, via an optional firewall 1305. The web server 1306 can then be connected to an application server 1308, via a firewall 1307. It will be appreciated that in this example the web and application servers 1306, 1308 and the firewalls 1305, 1307 perform an equivalent function to the base station 201 of the examples outlined above.

In this example, the application server 1308 executes applications software allowing the thread and package creation processes to be performed. The web server 1306 can then host web pages providing access to these services, as well as to allow content packages to be downloaded. The personal computer 1300 can provide access to the web pages hosted by the web server 1306, as well as allowing the content to be provided to one or more of the presentation devices 1301, 1302, 1303.

It will be appreciated that in this example, content and other data is transferred to the mobile device via the intermediate computer 1300. However, this is not essential and the content and data could alternatively be transferred directly to presentation devices such as the smartphone 1302 and the mobile phone 1303, via a mobile data network.

An example of this is shown in FIG. 14, in which the system includes a communications network 1400 such as a GSM, 3G or other mobile phone network, or a WiFi, or other similar wireless network. The communications network 1400 communicates wirelessly with a presentation device such as a PDA 1401, smartphone 1402, mobile phone 1403, or the like. The communications network 1400 is typically connected to a second communications network 1404, such as the Internet or a LAN, which is in turn connected to a web server 1406, via an optional firewall 1405. The web server 1406 can then be connected to an application server 1408, via a firewall 1407. It will be appreciated that in this example the web and application servers 1406, 1408 and the firewalls 1405, 1407 perform an equivalent function to the base station 201 of the examples outlined above.

It will be appreciated that operation of this configuration is similar to that described above with respect to FIG. 13, with the presentation devices 1401, 1402, 1403, communicating directly with the web server 1406, to allow content to be downloaded directly.

Figure 15:
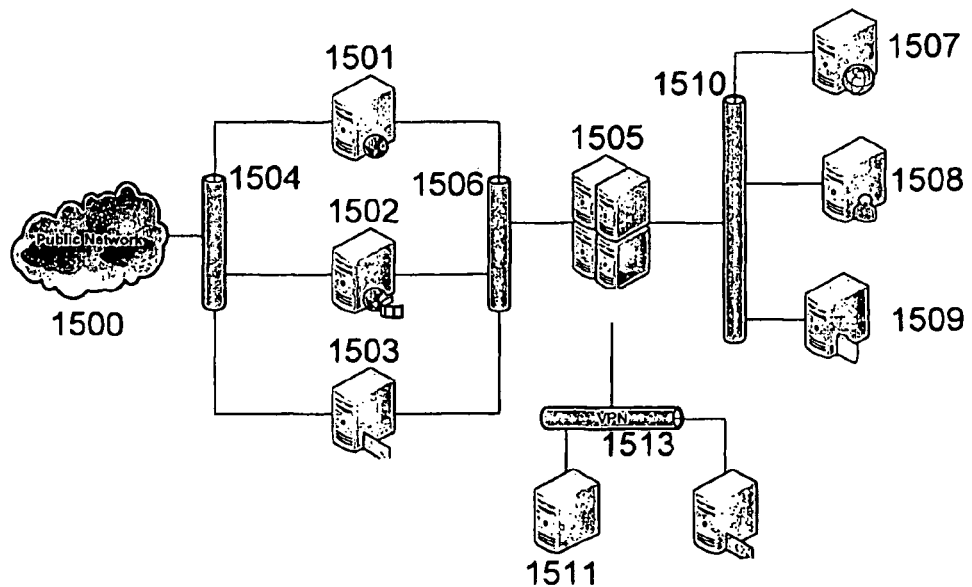
FIG. 15 is a schematic diagram of an example of a server architecture for presenting content.

In FIG. 15, additional details of an example base station 201 are shown. In this example, a public network 1500, such as the Internet, is connected to a web server 1501, a distribution and streaming server and a mail server 1503, via a network, such as a LAN 1504. The web, distribution and streaming, and mail servers 1501, 1502, 1503, are in turn connected to an application server 1505, via a LAN 1506. The application server is in turn connected to a content management server 1507, a customer database 1508, and an advertising server 1509, via a LAN 1510. The application server is in turn connected to a GIS server 1511 and a payment gateway 1512, via a Virtual Private Network 1513.

In this example, the application server 1505 again executes applications software allowing the thread and package creation processes to be performed. This can be achieved by retrieving content and second content such as advertising, from the content management and advertising servers 1507, 1509 respectively. The applications server 1505 also communicates with the customer database 1508 to allow information regarding user profiles and user accounts to be administered.

The web server 1501 can then host web pages providing access to these services. The distribution and streaming server 1502 allows packaged content to be downloaded or streamed to the computer 1300 and/or one of the presentation devices 1301, 1302, 1303, 1401, 1402, 1403. The mail server 1503 allows e-mail requests for information or assistance, or other communication with the user to be handled. Finally, the GIS server 1511 provides access to maps and other location related information, whilst the payment gateway 1512 is used to allow user payments to be processed.

Figure 16:
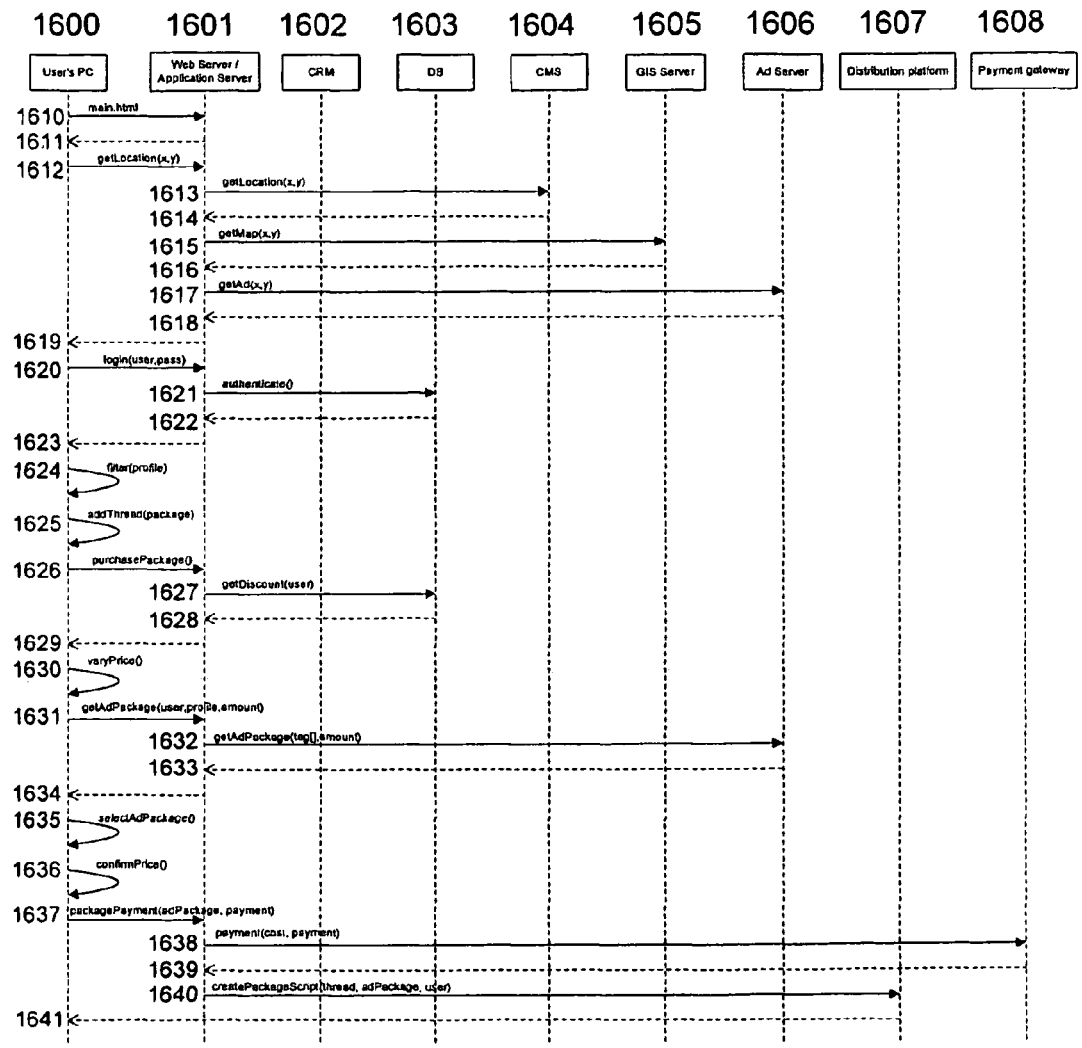
FIG. 16 is a sequence diagram of an example of the process of charging for content; and, FIG. 17 is a schematic diagram of an example use mechanism for the above described processes.

An example sequence diagram depicting the end to end process of a user creating a package of content and purchasing using the above described dynamic charging model is shown in FIG. 16.

In this example, a user computer 1600 communicates with a web sever 1601 to request a main web page as shown at 1610, causing the web server 1601 to return the web page at 1611. Location information relating to a specified location (x,y) can be sent by the computer 1600 to the web server 1601 at 1612. This may be performed automatically, or following for example a user request for sample information relating to the specified location.

This command is forwarded by the web server 1601 at 1613, 1615, 1617, to the content management server 1604, a GIS server 1605 and an ad server 1606 in turn. This allows content which may relate to the location, a map of the location and an ad which may relate to the location to be returned to the web server 1601 at 1614, 1616, 1618. The web server 1601 returns the content, map and advert to the computer 1600 at 1619, allowing this to be displayed as part of a web page.

At 1620, the computer 1600 provides a user name and password to the web server 1601, which authenticates the user name and password at 1621 using a customer database 1603. Assuming successful authentication at 1622, the web server 1601 provides a web page to the computer 1600 at 1623. This web page allows the computer 1600 to filter available content and select threads by adding these to a package, as shown at 1624, 1625.

Once a package has been selected, the computer 1600 can send a purchase package request to the web server 1601 at 1626. The web server 1601 queries the customer database 1603 at 1627 to determine if a discount can be obtained, with an indication of this being returned to the web server 1601 at 1628. An indication of any discounts are provided by the web server 1601 to the computer 1600 at 1629, allowing the user to determine a price for the selected content. The user can then select to vary the purchase price using the computer 1600 at 1630.

At 1631, the computer 1600 transfers an indication of the user profile and amount of the variation to the web server, which transfers the amount and one or more tags based on information in the user profile, to the ad server 1606 at 1632. The ad server 1606 transfers an indication of available options to the web server 1601 at 1633, allowing the web server 1601 to forward this to the computer 1600 at 1634. At 1635, the user uses the computer 1600 to select an ad package, and confirm the resulting price is acceptable at 1636.

At 1637 the computer 1600 returns an indication of the selected ad option, and payment information supplied by the user, to the web server 1601. The web server 1601 forwards the payment information to a payment gateway 1608 at 1638, allowing the payment gateway to confirm payment has been successful at 1639. Assuming this to be the case, the ad at used for identifying content of selected ad package to the web server 1601, transfers a create package script to a distribution server 1607 at 1640, allowing the distribution server 1607 to provide the content and/or any associated advertising, to the computer 1600 at 1641.

Figure 17:
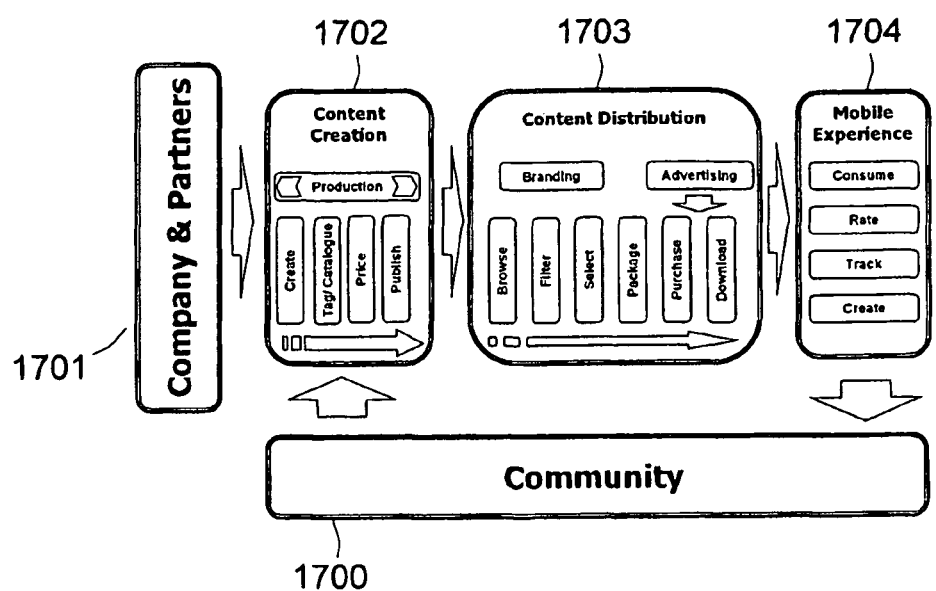

FIG. 17 shows an example use mechanism for the above described processes. In one example, the processes allow professional developers 1700 and community users 1701 to create content via creation tools shown generally at 1702. The content can then is then published to a distribution platform 1703, allowing users to browse, filter, select, purchase and download content. Finally users consume this content on mobile devices 1704, which allows users to rate consumed content, create new content and potentially sell back to content, such as travel data flow, to system hosts.

A non-limiting example application of an embodiment of the method/apparatus is now described. 'Dynamic Digital Stories' provides a product which allows a user (e.g. a reader/listener) to influence a sequence of narration and overall outcome of a piece of literature based on sensory input triggers or input by the user.

Assume the user is listening to a story which has been specifically written for a certain location, such as New York's Central Park. The physical location of the user is the primary input influencing the story flow and the decisions which are required throughout the narration. When a user reaches a certain point in space which corresponds to a preselected, predetermined or calculated point in, for example, a novel, an option is presented to the user. The option could be an audio queue, an onscreen display, etc. At this point the user is presented with content representative of a decision to be made by the user, such as turn left, go straight ahead, climb the stairs, etc. The story flow, characters, plot and outcome can thus adapt based on the decisions of the user.

Content is explicitly linked to some anchor, typically though not necessarily a location in space (e.g. a particular longitude, latitude). However, any measurable action could additionally and/or alternatively serve as an anchor, for example a user's heart rate, altitude, direction (e.g. up, down, left, right), time of day, day of year, etc. The content would be consumed/used on a device which has integrated or associated sensors to measure the required user initiated actions. However, if the device does not contain all necessary sensors an onscreen display could be used to capture an appropriate answer, or the device could contain a mapping between a requested measurement and some other sensor which the device does contain. For example, if the device does not contain a GPS receiver for a location measurement, the location measurement may be mapped to a certain button on the device for activation by the user.

Content can be purchased by the user through a digital commerce transaction, including but not limited to through the Internet or at a digital kiosk. Content can also be transferred virally between user devices over a network. When a user reaches a decision point in the story a question can be posed to the user and the user (or the device) needs to provide a measurable response which then directs the future flow of the narration.

A sample content structure follows:
a) Content is broken up into small pieces which relate to a set period between:
  i) Two decision points;
  ii) The start of the novel and a decision point;
  iii) A decision point and the end of the novel.
b) Content pieces have a set of rules which describe their range of activation scenarios, for example:
  i) Always accessible;
  ii) Play once;
  iii) Only accessible if content pieces x, y, z have been accessed;
  iv) Only accessible if previous content path is, for example, a-g-j;

v) Accessible if:
(1) User at latitude/longitude;
(2) Heart rate=x bpm;
vi) Not accessible if other users are close by (requires network link).

The content rules are what helps create a compelling user experience through the ability to link content pieces together in more than one way.

Persons skilled in the art will appreciate that numerous variations and modifications will become apparent. All such variations and modifications which become apparent to persons skilled in the art, should be considered to fall within the spirit and scope that the invention broadly appearing before described.

The term processing system is intended to encompass any one of the end stations, processing systems used within the base station and the presentation devices.

Whilst the above described examples have focussed on a process for distributing content via a communications network, it will be appreciated that this is for the purpose of illustration only, and that in practice content can be created and/or hosted on the same device that is used for subsequent presentation of the content.

The invention claimed is:

1. An apparatus, comprising:
a mobile device including at least one processor communicatively coupled to at least one input/output component, at least one interface, a memory, and at least one location sensor, the mobile device configured for:
displaying, utilizing the at least one input/output component, a plurality of packages developed by a plurality of different third party developers, at least one of the plurality of packages including at least one rule with at least one event criteria for controlling presentation triggering;
receiving, utilizing the at least one input/output component, a user selection of the at least one package, resulting in one or more selected packages including the at least one rule with the at least one event criteria for controlling presentation triggering;
receiving, utilizing the at least one interface, at least a portion of the one or more selected packages;
storing, utilizing the memory, the one or more selected packages;
receiving, utilizing the at least one external interface, at least a portion of content from at least one server in communication with the mobile device via a network, after the at least portion of the one or more selected packages is received;
identifying, utilizing the at least one location sensor, location data, after the at least portion of the one or more selected packages is received;
identifying, utilizing the at least one processor, an event, based on the at least one rule with the at least one event criteria, and the location data, after the at least portion of the one or more selected packages is received;
presenting, utilizing the at least one input/output component, a message in response to the identification of the event;
receiving, utilizing the at least one input/output component, user input after the presentation of the message; and
presenting, utilizing the at least one input/output component, at least part of the content, in response to the user input.

2. The apparatus of claim 1, wherein the mobile device is configured such that the message indicates an accessibility of the at least part of the content.

3. The apparatus of claim 1, wherein the mobile device is configured such that the message is automatically presented utilizing the at least one input/output component, in connection with at least one of a vibration or an audible alert.

4. The apparatus of claim 1, wherein the mobile device is configured such that the at least part of the content includes at least some of the at least portion of the content received from the at least one server.

5. The apparatus of claim 1, wherein the mobile device is configured such that the at least part of the content includes at least some of the at least portion of the content that is received from the at least one server, in response to the identification of the event.

6. The apparatus of claim 1, wherein the mobile device is configured such that the at least part of the content includes at least some of the at least portion of the content that is received from the at least one server, before the identification of the event.

7. The apparatus of claim 1, wherein the mobile device is configured such that the at least part of the content includes another portion of the content included in the received at least portion of the one or more selected packages.

8. The apparatus of claim 1, wherein the mobile device is configured such that the at least part of the content includes: at least some of the at least portion of the content received from the at least one server, and another portion of the content included in the received at least portion of the one or more selected packages.

9. The apparatus of claim 1, wherein the mobile device is configured such that the message includes at least some of the at least portion of the content received from the at least one server.

10. The apparatus of claim 1, wherein the mobile device is configured such that the message includes at least some of the at least portion of the content that is received from the at least one server, in response to the identification of the event.

11. The apparatus of claim 1, wherein the mobile device is configured such that the message includes at least some of the at least portion of the content that is received from the at least one server, before the identification of the event.

12. The apparatus of claim 1, wherein the mobile device is configured such that the message includes another portion of the content included in the received at least portion of the one or more selected packages.

13. The apparatus of claim 1, wherein the mobile device is configured such that the message includes: at least some of the at least portion of the content received from the at least one server, and another portion of the content included in the received at least portion of the one or more selected packages.

14. The apparatus of claim 1, wherein the mobile device is configured such that the event is identified utilizing the at least one processor, by comparing, utilizing the at least one processor, the location data and the at least on event criteria.

15. The apparatus of claim 1, wherein the mobile device is configured such that the event is identified utilizing the at least one processor, by processing a result of a comparison of the location data and the at least one rule.

16. The apparatus of claim 1, wherein the mobile device is configured such that the event is identified utilizing the at least one processor, by causing a comparison of the location data and the at least one rule, utilizing at least one server device.

17. The apparatus of claim 1, wherein the at least one location sensor includes a Bluetooth interface that is operable for being utilized, at least in part, to generate the location data.

18. The apparatus of claim 1, wherein the at least one location sensor includes a Bluetooth interface that is operable for being utilized to generate the location data.

19. The apparatus of claim 1, wherein the at least one location sensor includes a Bluetooth interface that is operable for working in connection with a GPS system for generating the location data.

20. The apparatus of claim 1, wherein the mobile device further includes at least one temporal sensor communicatively coupled to the at least one processor for being utilized in identifying temporal data.

21. The apparatus of claim 20, wherein the mobile device is configured such that the temporal sensor includes at least one of a clock or a timer.

22. The apparatus of claim 20, wherein the mobile device is configured such that the temporal data includes duration data.

23. The apparatus of claim 20, wherein the mobile device is configured such that the temporal data includes date data.

24. The apparatus of claim 20, wherein the mobile device is configured such that the event is identified, based on the at least one rule with the at least one event criteria, the location data, and the temporal data.

25. The apparatus of claim 20, wherein the mobile device is configured such that the event is identified, based on the at least one rule with the at least one event criteria, the location data, and the temporal data; such that the event is identified if the mobile device remains within a region for a predetermined duration.

26. The apparatus of claim 20, wherein the mobile device is configured such that the event is identified, based on the at least one rule with the at least one event criteria, the location data, and the temporal data; such that the event is identified if a location of the mobile device meets a location-related criteria for a predetermined duration.

27. The apparatus of claim 20, wherein the mobile device is configured such that the event is identified, based on the at least one rule with the at least one event criteria, the location data, and the temporal data; such that the event is identified if a location of the mobile device meets a location-related threshold criteria with respect to a predetermined location, where the location-related threshold criteria is met for a predetermined duration.

28. The apparatus of claim 1, wherein the mobile device is configured such that at least two event criteria are included with a predetermined order, such that the event is identified based on whether the at least two event criteria are met in the predetermined order.

29. The apparatus of claim 1, wherein the mobile device further includes at least one heart rate sensor communicatively coupled to the at least one processor for being utilized in identifying heart rate data, and the mobile device is configured such that another event is identified, based on another rule, and the heart rate data.

30. The apparatus of claim 1, and further comprising at least one heart rate sensor for being utilized in identifying heart rate data, and the mobile device is configured such that another event is identified, based on another rule, and the heart rate data.

31. The apparatus of claim 1, wherein the mobile device further includes at least one pedometer sensor communicatively coupled to the at least one processor for being utilized in identifying pedometer data, and the mobile device is configured such that another event is identified, based on another rule, and the pedometer data.

32. The apparatus of claim 1, and further comprising at least one pedometer sensor for being utilized in identifying pedometer data, and the mobile device is configured such that another event is identified, based on another rule, and the pedometer data.

33. The apparatus of claim 1, wherein the mobile device further includes at least one accelerometer sensor communicatively coupled to the at least one processor for being utilized in identifying accelerometer data, and the mobile device is configured such that another event is identified, based on another rule, and the accelerometer data.

34. The apparatus of claim 1, wherein the mobile device further includes at least one Bluetooth sensor communicatively coupled to the at least one processor for being utilized in identifying Bluetooth data, and the mobile device is configured such that the event is identified, based on the at least one rule with the at least one event criteria, the location data, and the Bluetooth data.

35. The apparatus of claim 1, wherein the at least one location sensor includes a GPS, and the mobile device further includes at least one Bluetooth sensor communicatively coupled to the at least one processor for being utilized in identifying Bluetooth data, and the mobile device is configured such that the event is identified, based on the at least one rule with the at least one event criteria, the location data, and the Bluetooth data.

36. The apparatus of claim 1, wherein the mobile device further includes at least one WiFi sensor communicatively coupled to the at least one processor for being utilized in identifying WiFi data, and the mobile device is configured such that the event is identified, based on the at least one rule with the at least one event criteria, the location data, and the WiFi data.

37. The apparatus of claim 1, wherein the mobile device is configured for receiving at least one tag, for use in searching for the at least one package.

38. The apparatus of claim 1, wherein the mobile device is configured such that
the plurality of packages are conditionally displayed, utilizing the at least one input/output component, based on a location of the mobile device.

39. The apparatus of claim 1, wherein the mobile device is configured such that the plurality of packages are conditionally displayed based on a username and a password.

40. The apparatus of claim 1, wherein the mobile device is configured for allowing at least one aspect of the presentation of the message to be set by the user utilizing the mobile device.

41. The apparatus of claim 40, wherein the mobile device is configured such that the at least one aspect includes a notification method.

42. The apparatus of claim 1, wherein the mobile device is configured such that the message is conditionally presented based on a user profile of the user.

43. The apparatus of claim 1, wherein the mobile device is configured such that the message is conditionally presented based on a number of times the message has been presented in the past.

44. The apparatus of claim 1, wherein the mobile device is configured such that the at least part of the content is conditionally presented based on a user profile of the user.

45. The apparatus of claim 1, wherein the mobile device is configured for presenting a warning if the at least one location sensor is unavailable.

46. The apparatus of claim 1, wherein the at least one package is configured such that the at least one rule includes a plurality of threads each with at least one different event and different content.

47. The apparatus of claim 1, wherein the at least one package includes a single package configured such that the at least one rule includes a plurality of threads each with at least one different event and different content.

48. The apparatus of claim 1, wherein the at least one package includes a single package with at least one visibility rule that dictates whether different content is accessible by the mobile device based on a relationship between a corporate entity associated with at least one of the different third party developers, and the user.

49. The apparatus of claim 1, wherein the at least one package includes a single package with a plurality of visibility rules that dictate whether the message or the at least part of the content is accessible by the mobile device based on a relationship with the user.

50. The apparatus of claim 1, wherein the at least one package includes a single package with a plurality of visibility rules that dictate whether different content is accessible by the mobile device based on a relationship between a corporate entity associated with at least one of the different third party developers, and the user.

51. The apparatus of claim 1, wherein the at least one package is configured such that the event criteria has a type and the location data is conditionally compared to the event criteria based on the type.

52. The apparatus of claim 1, wherein the apparatus is configured for causing display of a map and receiving developer input from at least one of the different third party developers in connection with the map to define the at least one event criteria.

53. The apparatus of claim 1, wherein the mobile device is configured for communicating with at least one platform that is capable of making the plurality of packages developed by the plurality of different third party developers accessible via the mobile device, such that the different third party developers are capable of defining at least one of the rule or the event criteria under the direction of an operator of the at least one platform.

54. The apparatus of claim 1, wherein a system including the apparatus is configured such that the different third party developers are capable of defining at least one of the rule or the event criteria under the direction of an operator of the system, and the user is capable of controlling, utilizing the mobile device, at least one aspect of the presentation of the message and the at least part of the content.

55. The apparatus of claim 1, and further comprising at least one application accessible to the different third party developers for supporting at least one aspect of the development of the plurality of packages utilizing a predetermined event criteria set.

56. The apparatus of claim 1, and further comprising at least one application accessible to the different third party developers for supporting the development of the plurality of packages utilizing a predetermined event criteria set, such that the different third party developers are capable of defining the at least one rule and the at least one event criteria under the confines of the predetermined event criteria set.

57. The apparatus of claim 1, wherein the mobile device is configured for communicating with at least one system that is capable of making at least one application accessible to the different third party developers for supporting at least one aspect of the development of the plurality of packages utilizing a predetermined event criteria set, such that the different third party developers are capable of defining the at least one event criteria per the predetermined event criteria set, where the at least one system is further capable of making the plurality of packages developed by the plurality of different third party developers accessible via the mobile device, such that the user is capable of controlling a notification in connection with the message, utilizing the mobile device.

58. The apparatus of claim 1, and further comprising at least one application accessible to the different third party developers for supporting at least one aspect of a creation of the plurality of packages utilizing a predetermined event criteria set, such that the different third party developers are capable of defining the at least one event criteria per the predetermined event criteria set.

59. The apparatus of claim 58, wherein the at least one application includes a tool.

60. The apparatus of claim 1, wherein the mobile device is configured for presenting the message and the at least part of the content utilizing a watch.

61. The apparatus of claim 1, and further comprising a watch for presenting the at least part of the content.

62. The apparatus of claim 1, wherein the mobile device is configured such that the at least one event criteria involves at least two of: reaching a destination at a specific speed, reaching the destination from a specific direction, reaching the destination during a specific year, reaching the destination during a specific day, reaching the destination at a specific time, reaching the destination within a specific start time, reaching a destination and outside temperature exceeds a specific degree, reaching a destination and the outside temperature is below a specific degree, reaching a destination at a minimum heart rate, reaching a destination at a specified heart rate, entering a region at a specific speed, entering the region from a specific direction, entering the region during a specific year, entering the region during a specific day, entering the region at a specific time, entering the region within a specific start time, entering a region and outside temperature exceeds a specific degree, entering a region and the outside temperature is below a specific degree, entering a region at a minimum heart rate, entering a region at a specified heart rate, reaching a target heart rate while elevation is increasing, and speed decreasing by a specified rate while elevation increases.

63. The apparatus of claim 1, wherein the mobile device is configured such that the at least one event criteria involves at least three of: reaching a destination at a specific speed, reaching the destination from a specific direction, reaching the destination during a specific year, reaching the destination during a specific day, reaching the destination at a specific time, reaching the destination within a specific start time, reaching a destination and outside temperature exceeds a specific degree, reaching a destination and the outside temperature is below a specific degree, reaching a destination at a minimum heart rate, reaching a destination at a specified heart rate, entering a region at a specific speed, entering the region from a specific direction, entering the region during a specific year, entering the region during a specific day, entering the region at a specific time, entering the region within a specific start time, entering a region and outside temperature exceeds a specific degree, entering a region and the outside temperature is below a specific degree, entering a region at a minimum heart rate, entering a region at a specified heart rate, reaching a target heart rate while elevation is increasing, and speed decreasing by a specified rate while elevation increases.

64. The apparatus of claim 1, wherein the mobile device is configured such that the at least one event criteria involves at least four of: reaching a destination at a specific speed, reaching the destination from a specific direction, reaching the destination during a specific year, reaching the destination during a specific day, reaching the destination at a specific time, reaching the destination within a specific start time, reaching a destination and outside temperature exceeds a specific degree, reaching a destination and the outside temperature is below a specific degree, reaching a destination at a minimum heart rate, reaching a destination at a specified heart rate, entering a region at a specific speed, entering the region from a specific direction, entering the region during a specific year, entering the region during a specific day, entering the region at a specific time, entering the region within a specific start time, entering a region and outside temperature exceeds a specific degree, entering a region and the outside temperature is below a specific degree, entering a region at a minimum heart rate, entering a region at a specified heart rate, reaching a target heart rate while elevation is increasing, and speed decreasing by a specified rate while elevation increases.

65. The apparatus of claim 1, and further comprising the at least one server.

66. The apparatus of claim 1, and further comprising the network.

67. The apparatus of claim 1, wherein the mobile device is configured such that the message includes a notification, and the at least part of the content includes a first content instance.

68. The apparatus of claim 1, wherein the mobile device is configured such that the message includes a first content instance, and the content includes a second content instance.

69. The apparatus of claim 1, wherein the mobile device is configured such that the at least one processor is communicatively coupled to the at least one input/output component, the at least one interface, the memory, and the at least one location sensor; utilizing at least one bus.

70. The apparatus of claim 1, wherein the mobile device is configured such that an entirety of the one or more selected packages is received.

71. The apparatus of claim 1, wherein the mobile device is configured such that at least one of:
  said one or more downloaded packages is the one or more selected packages;
  said at least one input/output component includes a keyboard;
  said at least one input/output component includes a display;
  said at least one input/output component includes a screen;
  said at least one input/output component includes a keyboard and a display;
  said at least one interface includes at least one of a cellular interface or a WiFi interface;
  said at least one interface includes at least one of an external interface or a communication module;
  said at least one package includes at least one thread;
  said at least one package includes the at least part of the content;
  said at least one package includes a content package;
  said at least one package includes a software package;
  said at least one rule includes a trigger rule;
  said at least one rule is associated with a respective content instance;
  said at least one rule is defined by metadata;
  said at least one rule includes an if-then rule;
  said at least one rule is stored as part of the one or more selected packages;
  said at least one rule is stored separate from the one or more selected packages;
  said at least one event criteria defines at least one condition;
  said at least one event criteria defines the event;
  said at least one event criteria defines at least one trigger event;
  said at least one event criteria defines a sequence of events;
  said at least portion of the content is received utilizing the at least one external interface, by retrieving the at least portion of the content;
  said at least portion of the content is received utilizing the at least one external interface, after the event is identified;
  said presentation triggering includes presentation of the message;
  said controlling presentation triggering includes controlling a location where the message is presented;
  said controlling presentation triggering includes controlling a place and time where the message is presented;
  said controlling presentation triggering includes controlling a location where the at least part of the content is presented;
  said controlling presentation triggering includes controlling a place and time where the at least part of the content is presented;
  said location data includes location information;
  said location data includes an absolute location;
  said location data includes a region;
  said location data includes a threshold;
  said location data is identified utilizing the at least one location sensor, by receiving the location data from the at least one location sensor;
  said location data includes location information relating to a specified location (x,y);
  said location sensor includes a position sensor;
  said location sensor includes a GPS sensor or a Bluetooth interface sensor;
  said event includes a situation when the location data triggers the event criteria of the at least one rule;
  said event criteria indicates at least one aspect of the event that triggers the at least one rule for controlling presentation triggering;
  said message allows for an activation of the content;
  said message is stored as part of the one or more selected packages;
  said message is stored separate from the one or more selected packages;
  said user input is received in response to the presentation of the message;
  said user input acknowledges the message;
  said content includes a content instance;
  said at least part of the content includes at least one of text or an image;
  said at least part of the content is stored separate from the one or more selected packages; or
  said at least part of the content includes the at least portion of the content.

72. The apparatus of claim 1, wherein the mobile device is configured such that at least one of:
  said triggering is determined utilizing the at least one rule with at least one event criteria, and the location data;
  said triggering is determined utilizing the at least one rule with at least one event criteria, and a time or a date data;
  said triggering is determined utilizing the at least one rule with at least one event criteria, and the time data;
  said triggering is determined utilizing the at least one rule with at least one event criteria, and the date data; or
  said triggering includes a trigger event.

73. A computer program product embodied on a non-transitory computer readable medium, comprising:
  a package component for use in connection with a particular package; and code for submitting the package component to a system including at least one processor, the system configured to cooperate with a mobile device configured to:

display the particular package among a plurality of packages developed by a plurality of different third party developers, the particular package including at least one rule with at least one event criteria for controlling content presentation;

receive a user selection of the particular package, resulting in a selected package including the at least one rule with the at least one event criteria for controlling content presentation;

receive at least a portion of the selected package, resulting in an installed package including the at least one rule with the at least one event criteria for controlling content presentation;

receive at least a portion of content from at least one server in communication with the mobile device via a network, utilizing the installed package;

identify location data, after the at least portion of the selected package is received;

identify an event, based on the at least one rule with the at least one event criteria, and the location data, after the at least portion of the selected package is received;

present a message, after the identification of the event;

receive user input, after the presentation of the message; and present at least part of the content that is different from the message, in response to the user input.

74. The computer program product of claim 73, wherein the particular package is configured such that the message indicates an accessibility of the at least part of the content.

75. The computer program product of claim 73, wherein the particular package is configured for utilizing a Bluetooth interface to generate the location data.

76. The computer program product of claim 73, wherein the particular package is configured for identifying temporal data, and the particular package is configured such that the event is identified, based on the at least one rule with the at least one event criteria, the location data, and the temporal data; where the event is identified if a location of the mobile device meets a location-related criteria for a predetermined duration.

77. The computer program product of claim 73, wherein the particular package is configured for identifying temporal data, and the particular package is configured such that the event is identified, based on the at least one rule with the at least one event criteria, the location data, and the temporal data; where the event is identified if a location of the mobile device meets a location-related threshold criteria with respect to a predetermined location where such location-related threshold criteria is met for a predetermined duration.

78. The computer program product of claim 73, wherein the particular package is configured such that the at least one rule has at least two event criteria and a predetermined order, where the event is identified based on whether the at least two event criteria are met in the predetermined order.

79. The computer program product of claim 73, wherein the at least one package is configured such that the at least one rule includes a plurality of threads each with at least one different event and different content.

80. The computer program product of claim 73, wherein the package component is configured for use with at least one application accessible to the different third party developers for supporting the development of the plurality of packages utilizing a predetermined event criteria set, such that the different third party developers are capable of defining the at least one rule under the confines of the predetermined event criteria set.

81. The computer program product of claim 73, wherein the package component is configured for use with at least one application accessible to the different third party developers for supporting at least one aspect of the development of the plurality of packages utilizing a predetermined event criteria set, such that the different third party developers are capable of defining the at least one event criteria per the predetermined event criteria set, where the at least one system is further capable of making the plurality of packages developed by the plurality of different third party developers accessible via the mobile device, such that the user is capable of controlling a notification in connection with the message, utilizing the mobile device.

82. The computer program product of claim 73, wherein the particular package is received with the package component, the package component including the at least one event criteria.

83. The computer program product of claim 73, wherein the particular package includes the package component, the package component including at least some of the content.

84. A system, comprising:

at least one server communicatively coupled to a network and configured to make at least a portion of content accessible to a plurality of mobile devices via the network; and a package part embodied on a non-transitory computer readable medium that is at least part of a particular package including at least one rule with at least one event criteria for controlling content presentation, the particular package configured to cooperate with at least one of the plurality of mobile devices operable to:

display the particular package among a plurality of packages developed by a plurality of different third party developers;

receive a user selection of the particular package, resulting in a selected package including the at least one rule with the at least one event criteria for controlling content presentation;

receive at least a portion of the selected package, resulting in an installed package including the at least one rule with the at least one event criteria for controlling content presentation;

receive the at least portion of the content from the at least one server in communication with the at least one mobile device via a network, utilizing the installed package;

identify location data, after the at least portion of the selected package is received;

identify an event, based on the at least one rule with the at least one event criteria, and the location data, after the at least portion of the selected package is received;

present a message, after the identification of the event;

receive user input, after the presentation of the message; and present at least part of the content that is different from the message, in response to the user input.

85. The system of claim 84, wherein the particular package is configured such that the message indicates an accessibility of the at least part of the content.

86. The system of claim 84, wherein the particular package is configured for utilizing a Bluetooth interface to identify the location data.

87. The system of claim 84, wherein the particular package is configured for identifying temporal data, such that the event is identified, based on the at least one rule with the at least one event criteria, the location data, and the temporal data; where the event is identified if a location of the at least one mobile device meets a location-related criteria for a predetermined duration.

88. The system of claim 84, wherein the particular package is configured for identifying temporal data, such that the event is identified, based on the at least one rule with the at least one event criteria, the location data, and the temporal data; where the event is identified if a location of the at least one mobile device meets a location-related threshold criteria with respect to a predetermined location where such location-related threshold criteria is met for a predetermined duration.

89. The system of claim 84, wherein the particular package is configured such that the at least one rule has at least two event criteria and a predetermined order, such that the event is identified based on whether the at least two event criteria are met in the predetermined order.

90. The system of claim 84, wherein the package part includes at least some of the content and at least one aspect of the at least one event criteria.

91. The system of claim 84, wherein the at least one package includes a single package with a plurality of visibility rules that dictate whether different content is accessible by the at least one mobile device based on a relationship between a corporate entity associated with at least one of the different third party developers, and the user.

92. The system of claim 84, wherein the system is configured for causing display of a map and receiving developer input from at least one of the different third party developers in connection with the map to define the at least one event criteria.

93. The system of claim 84, and further comprising at least one application accessible to the different third party developers for supporting the development of the plurality of packages utilizing a predetermined event criteria set, such that the different third party developers are capable of defining the at least one event criteria under the confines of the predetermined event criteria set.

94. The system of claim 84, and further comprising at least one application accessible to the different third party developers for supporting at least one aspect of the development of the plurality of packages utilizing predetermined event criteria, such that the different third party developers are capable of defining the at least one event criteria per the predetermined event criteria, where the at least one system is further capable of making the plurality of packages developed by the plurality of different third party developers accessible via the at least one mobile device, such that the user is capable of controlling a notification in connection with the message, utilizing the at least one mobile device.

95. A system, comprising:
    means for displaying a plurality of packages developed by a plurality of different third party developers, at least one of the plurality of packages including at least one rule with at least one event criteria for controlling presentation triggering;
    means for receiving a user selection of the at least one package, resulting in one or more selected packages including the at least one rule with the at least one event criteria for controlling presentation triggering;
    means for receiving at least a portion of the one or more selected packages;
    means for storing the one or more selected packages;
    means for receiving at least a portion of content from at least one server in communication with the mobile device via a network, after the at least portion of the one or more selected packages is received;
    means for identifying location data, after the at least portion of the one or more selected packages is received;
    means for identifying an event, based on the at least one rule with the at least one event criteria, and the location data, after the at least portion of the one or more selected packages is received;
    means for presenting a message in response to the identification of the event;
    means for receiving user input after the presentation of the message; and
    means for presenting at least part of the content, in response to the user input.

\* \* \* \* \*